US010739620B2

(12) United States Patent
Ram et al.

(10) Patent No.: US 10,739,620 B2
(45) Date of Patent: Aug. 11, 2020

(54) SOLID STATE TOUCHCHROMIC DEVICE

(71) Applicant: University of South Florida, Tampa, FL (US)

(72) Inventors: Manoj Kumar Ram, Palm Harbor, FL (US); D. Yogi Goswami, Tampa, FL (US); Lee K. Stefanakos, Tampa, FL (US)

(73) Assignee: University of South Florida, Tampa, FL (US)

(*) Notice: Subject to any disclaimer, the term of this patent is extended or adjusted under 35 U.S.C. 154(b) by 0 days.

(21) Appl. No.: 16/046,645

(22) Filed: Jul. 26, 2018

(65) Prior Publication Data

US 2019/0033625 A1 Jan. 31, 2019

Related U.S. Application Data

(60) Provisional application No. 62/537,085, filed on Jul. 26, 2017.

(51) Int. Cl.

| | |
|---|---|
| ***G02F 1/01*** | (2006.01) |
| ***G02F 1/23*** | (2006.01) |
| ***C09K 9/02*** | (2006.01) |

(52) U.S. Cl.

CPC .............. *G02F 1/0102* (2013.01); *C09K 9/02* (2013.01); *G02F 1/0121* (2013.01); *G02F 1/23* (2013.01); *C09K 2211/1018* (2013.01)

(58) Field of Classification Search

CPC .......... G02F 1/00; G02F 1/153; G02F 1/0018; G02F 1/155; G02F 1/0102; G02F 1/0121; G02F 1/1525; G02F 1/23; G02F 2001/1515; C09K 9/02; C09K 2211/1018

USPC ......................... 359/240, 265, 270, 273, 275

See application file for complete search history.

(56) References Cited

U.S. PATENT DOCUMENTS 4,638,024 A 1/1987 Sato et al.
4,750,817 A * 6/1988 Sammells ................ G02F 1/15 359/270
5,086,351 A * 2/1992 Couput ................ G02F 1/1525 204/192.1

(Continued)

FOREIGN PATENT DOCUMENTS

JP 2006-172743 A 6/2006

OTHER PUBLICATIONS

Ahmad et al., "Preparation and physical properties of (PVA)0.7(NaBr)0.3(H3PO4)xM solid acid membrane for phosphoric acid—Fuel cells," Journal of advanced research, 2013, 4(2): 155-161.

(Continued)

*Primary Examiner* — Jie Lei

(74) *Attorney, Agent, or Firm* — Meunier Carlin & Curfman LLC

(57) ABSTRACT

Disclosed herein is a solid touchchromic device. The solid touchchromic device may include a conducting polymer or a conducting polymer composite film, a conducting plate, and a solid layer of a polymer-based electrolyte, the conducting plate being at least partially coated by the conducting polymer or the conducting polymer composite film. The solid touchchromic device may further include an oxidant, a salt, an acid, or a metal. Also included are methods of producing a solid touchchromic device and articles including a solid touchchromic device.

19 Claims, 21 Drawing Sheets
(18 of 21 Drawing Sheet(s) Filed in Color)

(56) References Cited

U.S. PATENT DOCUMENTS

| | | | | |
|---|---|---|---|---|
| 5,253,100 | A | 10/1993 | Yang et al. | |
| 9,684,218 | B2 | 6/2017 | Ram et al. | |
| 2004/0059016 | A1 * | 3/2004 | Nishikitani | H01B 1/122 523/1 |
| 2016/0109776 | A1 | 4/2016 | Ram et al. | |

OTHER PUBLICATIONS

Ashwell, “Photochromic memory devices,” Nature 1990, 347, 617.

Chen et al., “Behind the color switching in gasochromic VO2,” Physical Chemistry Chemical Physics 2015, 17, 3482-3489.

Dalton et al., “Super-tough carbon-nanotube fibres,” Nature, 2003, 423(6941): 703-703.

Dautremont-Smith, “Transition metal oxide electrochromic materials and displays: a review: Part 1: oxides with cathodic coloration,” Displays, 1982, 3(1): 3-22.

Dautremont-Smith, “Transition metal oxide electrochromic materials and displays: a review: Part 2: oxides with anodic coloration,” Displays, 1982, 3(2): 67-80.

Evans et al., “The generic enhancement of photochromic dye switching speeds in a rigid polymer matrix,” Nature materials, 2005, 4: 249-253.

Granqvist, “Out of a niche,” Nature Materials, 2006, 5: 89-90.

Grätzel, “Ultrafast colour displays,” Nature, 2001, 409(6820): 575-6.

Huang et al., “Optical Properties of Polyaniline,” Polymer 1993, 34(9): 1833-1845.

Iribarren et al., “Absortion in Polyvinyl Alcohol-Phosphoric Acid Films Under Different Processing Conditions. Kinetic Study,” Revista Cubana De Quimica, 2009, 21(2): 3-9.

Kuroiwa et al., “Heat-Set Gel-like Networks of Lipophilic Co(II) Triazole Complexes in Organic Media and Their Thermochromic Structural Transitions,” Journal of the American Chemical Society, 2004, 126(7): 2016-2021.

Li et al., “A high-performance flexible fibre-shaped electrochemical capacitor based on electrochemically reduced graphene oxide,” Chemical Communications, 2013, 49, 291-293.

Matsuda et al., “Proton conductivities of sol-gel derived phosphosilicate gels in medium temperature range with low humidity,” Solid State Ionics, 2002, 154, 687-692.

Meftah et al., “Structural, Optical and Electrical Properties of PVA/PANI/Nickel Nanocomposites Synthesized by Gamma Radiolytic Method,” Polymers, 2014, 6(9): 2435-2450.

Mohamed Saat et al., “Effect of Phosphoric Acid Concentration on the Optical Properties of Partially Phosphorylated PVA Complexes,” International Journal of Polymer Science, 2014, vol. 2014, article ID 495875, 8 pages.

Morita et al., “Thermochromism in an organic crystal based on the coexistence of $\sigma$- and $\pi$-dimers,” Nature materials, 2008, 7(1): 48-51.

Mortimer et al., “Electrochromic organic and polymeric materials for display applications,” Displays 2006, 27, 2-18.

Mortimer, “Electrochromic materials,” Chemical Society Reviews, 1997, 26, 147-156.

OMEGA.com, “Transactions in measurement and control,” <http://www.omega.com/literature/transactions/transactions_Vol_I.pdf> 1998.

Paddeu et al., “Langmuir-Schaefer films of a poly(o-anisidine) conducting polymer for sensors and displays,” Nanotechnology, 1998, 9(3): 228-236.

Ram et al., “A new chromic (TouchChromic) thin film,” Acta Materialia, 2016, 121, 325-330.

Ram et al., “Conducting Polymer Nanocomposite Membrane as Chemical Sensors,” Sensors for chemical and biological applications, 1st edn. CRC Press, Boca Raton, FL, (2010) 43-72.

Ram et al., “Electrochemical and optical characteristics of conducting poly(o-toluidine) films,” Thin Solid Films, 1997, 304(1-2): 65-69.

Ram et al., “Performance of electrochromic cells of polyaniline in polymeric electrolytes,” Journal of materials science letters, 1994, 13(20): 1490-1493.

Rosseinsky et al., “Electrochromic Systems and the Prospects for Devices,” Advanced Materials, 2001, 13(11): 783-793.

Samzadeh-Kermani et al., “Polyvinyl Alcohol/Polyaniline/ZnO Nanocomposite: Synthesis, Characterization and Bactericidal Property,” Advances in Biological Chemistry, 2016, 6(1) 1-11.

Vermeulen et al., “Stable photoinduced charge separation in layered viologen compounds,” Nature, 1992, 358, 656-658.

Wang et al., “Preparation of PANI-PVA composite film with good conductivity and strong mechanical property,” Plastics, Rubber and Composites, 2015, 44(8): 345-349.

Yao et al., “Photochromism induced in an electrolytically pretreated Mo03 thin film by visible light,” Nature, 1992, 355, 624-626.

Yoshino et al., “Effect of Polymer Elongation on the Absorption Spectrum of Poly(3-alkylthiophene),” Japanese journal of applied physics, 1988, 27, L716.

Zhou et al., VO2 thermochromic smart window for energy savings and generation, Scientific reports, 2013, 3, 3029.

International Search Report and Written Opinion for Application No. PCT/US2018/043906 dated Oct. 3, 2018 (18 pages).

International Preliminary Report relating to PCT/US2018/043906, dated Feb. 6, 2020.

* cited by examiner

SOLID STATE TOUCHCHROMIC DEVICE

CROSS-REFERENCE TO RELATED APPLICATION(S)

This application claims priority to U.S. Provisional Patent Application No. 62/537,085, filed on Jul. 26, 2017, the entire contents of which are fully incorporated herein by reference.

BACKGROUND OF THE INVENTION

Electrochromic devices can be made from two transparent conductive electrodes with an electroactive multilayer chromic structure in-between the two electrodes. The chromic structure on the conducting layer can include one or more layers of a conducting polymer (CP) or a metal oxide (MO) and an electrolyte layer. Photochromic devices, unlike electrochromic devices, do not require external electric power. However, the coloration and decoloration of photochromatic devices is slow compared to electrochromic devices. Therefore, there is a need for chromic devices that can operate without an external power source and can undergo coloration and decoloration faster than current photochromatic devices.

SUMMARY OF THE INVENTION

In one aspect, disclosed are solid touchchromic devices comprising a solid electrolyte layer derived from a polymer, an acid, and an oxidant, a conductive plate; and a conductive polymer film in contact with the conductive plate and the solid electrolyte layer.

In another aspect, disclosed are articles comprising the solid touchchromic devices disclosed herein, wherein the article is selected from the group consisting of a sensor, a mirror, a window, a toy, a display, a detector, sunglasses, and camouflage.

In another aspect, disclosed are compositions derived from poly(vinyl alcohol) (PVA), $H_3PO_4$, and ammonium peroxydisulphate (APS), wherein the composition is a gel.

In another aspect, disclosed are methods of producing a solid touchchromic device, the method comprising applying a conductive polymer film to a conductive plate; combining a polymer, an acid, and an oxidant to provide a mixture; applying the mixture to the conductive polymer film to provide a solid electrolyte layer on the conductive polymer film, such that the conductive polymer film contacts the conductive plate and the solid electrolyte layer; and heating the solid electrolyte layer, the conductive polymer film and the conductive plate at less than 80° C. to form a solid touchchromic device as disclosed herein.

In another aspect, disclosed are methods of using a solid touchchromic device, the method comprising contacting the solid electrolyte layer or a second conductive plate with the metal of a solid touchchromic device as disclosed herein, wherein the solid touchchromic device changes from a first color to a second color in response to the metal contacting the solid electrolyte layer or the second conductive plate; and optionally moving the metal out of contact with the solid electrolyte layer or the second conductive plate, wherein the solid touchchromic device changes from the second color to the first color in response to the metal no longer contacting the solid electrolyte layer or the second conductive plate.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

FIG. 15 is an image showing beakers containing electrolytic solutions of PVA and HCl, with HCl concentrations varying from 2 M on the left to 0.125 M on the right.

FIG. 16 is an image showing containers of different electrolytic solutions of APS and HCl. All solutions shown have 0.1 M APS concentration, and HCl concentrations vary from 2 M on the left to 0.125 M on the right.

DETAILED DESCRIPTION

Figure 1:
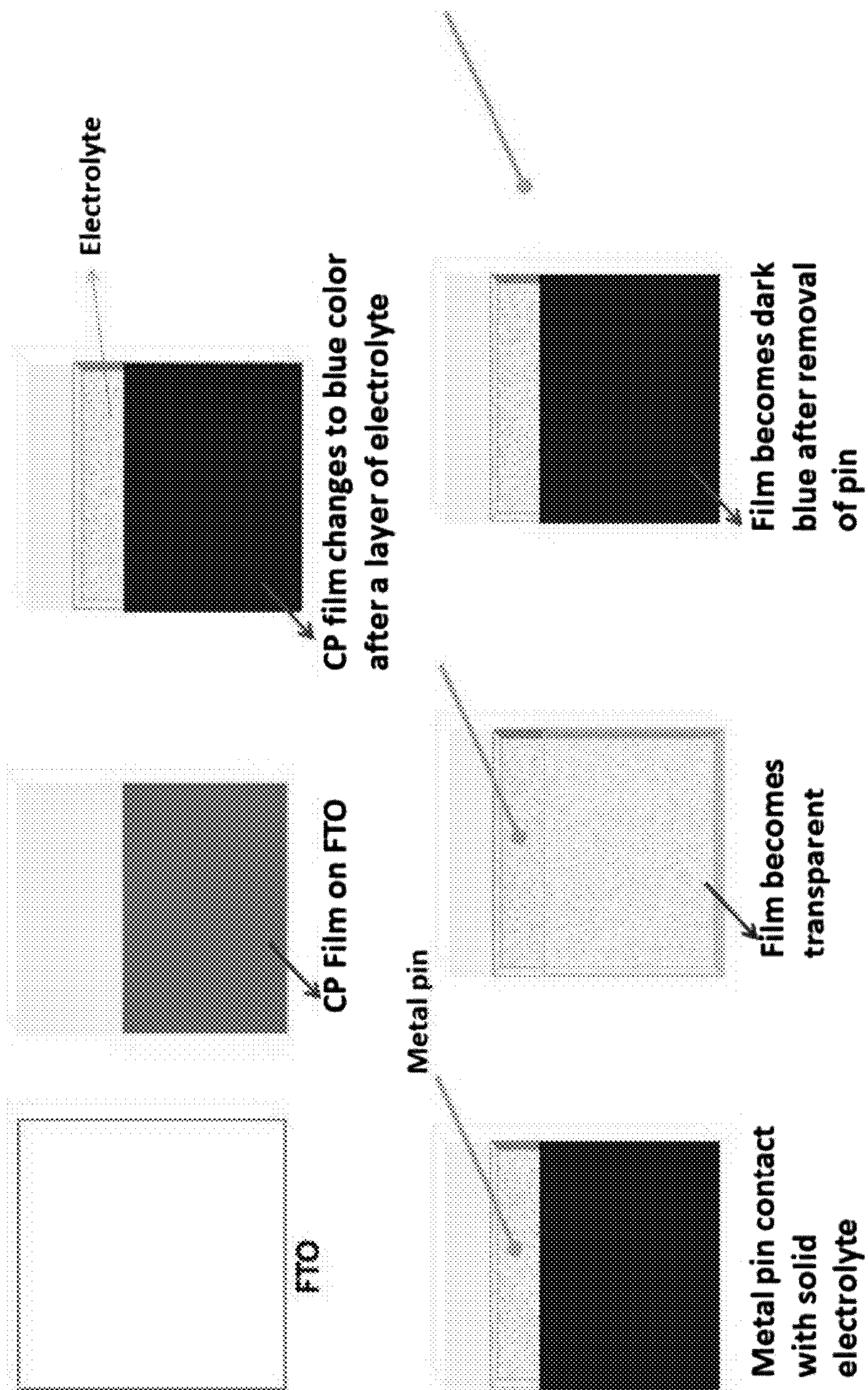
FIG. 1 is a schematic of a solid state touchchromic device changing color, the device including a solid electrolyte layer, a conductive polymer film, and a fluorine doped tin oxide (FTO) coated glass where the conductive polymer film is positioned between the solid electrolyte layer and the FTO coated glass.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

1. DEFINITIONS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)", "include(s)", "having", "has", "can", "contain(s)", and variants thereof, as used herein, are intended to be open-ended transitional phrases, terms, or words that do not preclude the possibility of additional acts or structures. The singular forms "a", "and", and "the" include plural references unless the context clearly dictates otherwise. The present disclosure also contemplates other embodiments "comprising", "consisting of", and "consisting essentially of", the embodiments or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrase "at least one of A, B, . . . and N" or "at least one of A, B, . . . N, or combinations thereof" are defined in the broadest sense to mean one or more elements selected from the group comprising A, B, . . . and N, that is to say, any combination of one or more elements A, B, . . . or N including any one element alone or in combination with one or more of the other elements, which may also include, in combination, additional elements not listed.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4". The term "about" may refer to plus or minus 10% of the indicated number. For example, "about 10%" may indicate a range of 9% to 11%, and "about 1%" may mean from 0.9-1.1. Other meanings of "about" may be apparent from the context, such as rounding off, so, for example "about 1" may also mean from 0.5 to 1.4.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. SOLID TOUCHCHROMIC DEVICES

Disclosed herein are solid touchchromic devices that include a solid electrolyte layer derived from a polymer, an acid, and an oxidant; a conductive plate; and a conductive polymer film in contact with the conductive plate and the solid electrolyte layer. As used herein a "touchchromic device" refers to a device which has properties which cause it to change color such as from blue/violet to transparent, when it is contacted either directly or indirectly by a material that can act as a source of electrons, such as a metal pin. Colors that the solid touchchromic device can present are not limited, and can include any color within the visible spectrum. Removal of the metal contact can bring back the original color of the solid touchchromic device. The color change of the device can be dependent on the type of conducting polymer (or conducting polymer-composite), thickness of the film, oxidant, acid, the composition of the electrolyte, and types of metals. In addition, "contact" as used herein refers to physical contact, electrical contact or both.

Figure 2:
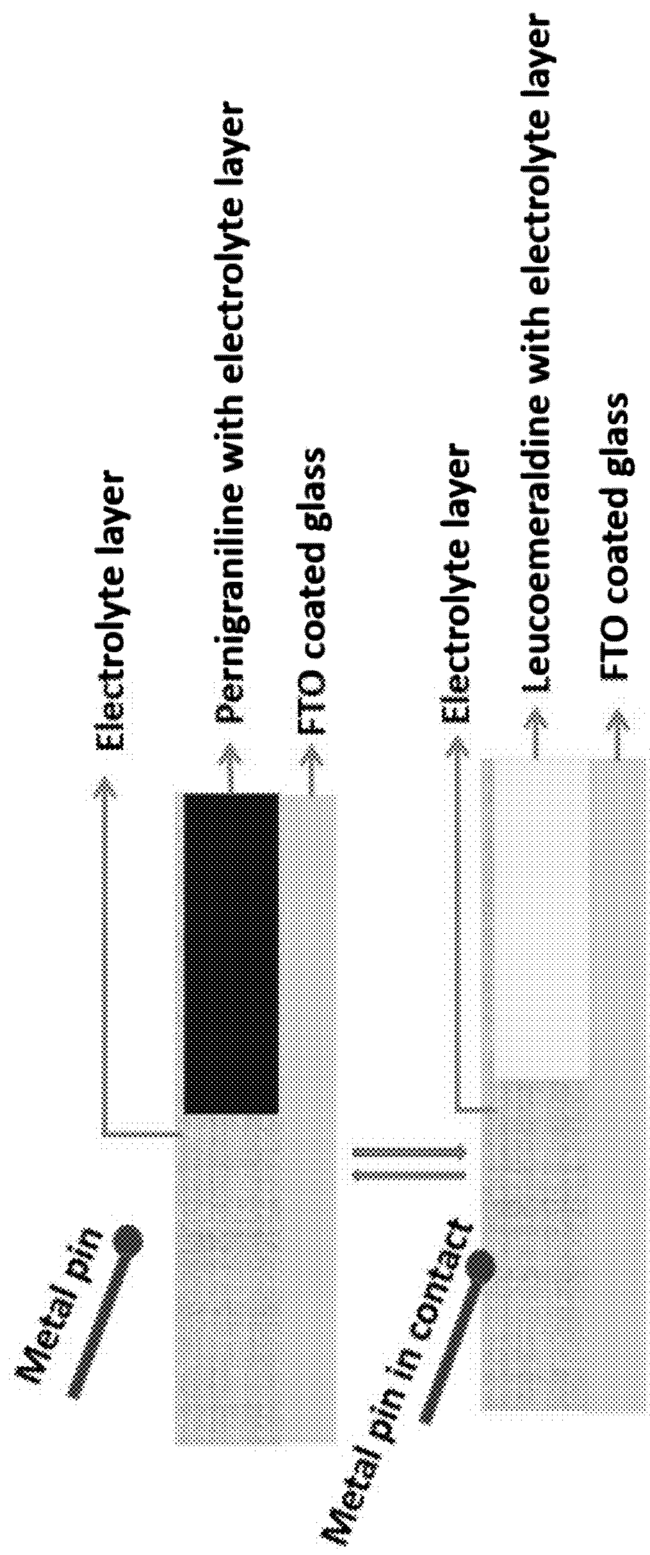
FIG. 2 is a schematic of a solid state touchchromic device changing color after a metal pin has come in contact with the solid electrolyte layer.
Figure 21:
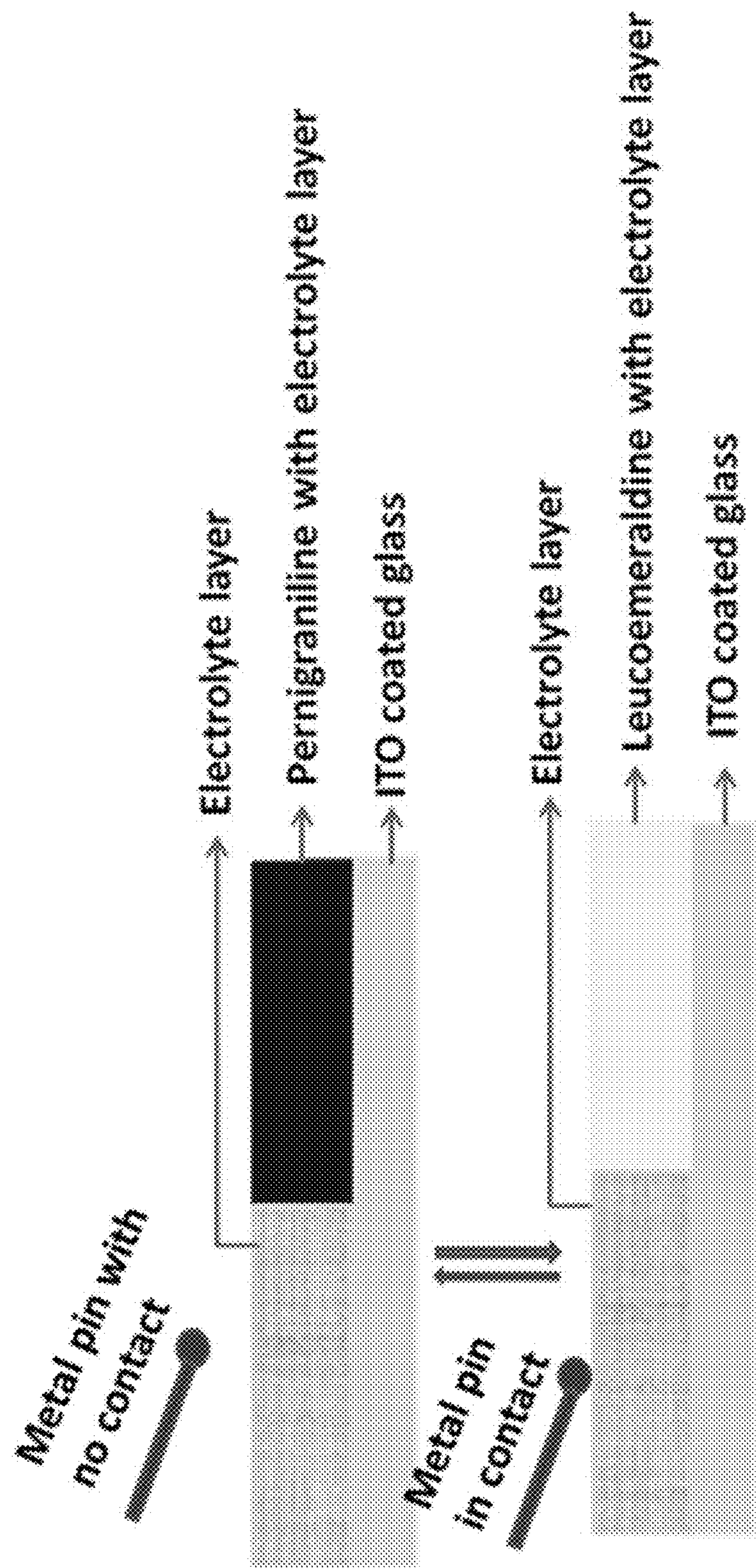
FIG. 21 is a schematic showing the color change in a solid touchchromic device.

FIG. 1 shows a schematic of a solid touchchromic device according to the present disclosure, including a solid electrolyte layer and a conducting polymer or conducting polymer-composite film deposited on FTO coated glass. In this exemplary embodiment, a gel electrolyte including polyvinyl alcohol (PVA), phosphoric acid ($H_3PO_4$) or hydrochloric acid (HCl), and APS oxidant ($(NH_4)_2S_2O_8$) was applied to a PANI film. The initial film color (green) can change to dark blue or violet, suggestive of the pernigraniline (PNB) form of the PANI film. The touchchroism mechanism for the solid touchchromic devices was unknown prior to this disclosure, and discussion on the mechanism can be found below in the Examples. Further schematics of embodiments of the solid touchchromic device can be seen in FIG. 2 and FIG. 21.

The solid touchchromic device does not require any externally applied energy, such as electrical, light, or thermal energy in order to change color, which is in contrast to electrochromic, gasochromic, photochromic, and thermochromic films. In addition to being able to operate without an external input power source, the solid touchchromic device can change color in fast time scales such as seconds to minutes. For example, the solid touchchromic device can change from a first color to a second color in about 1 second after contact with a metal, about 5 seconds after contact with a metal, about 10 seconds after contact with a metal, about 30 seconds after contact with a metal, about 1 minute after contact with a metal, about 5 minutes after contact with a metal, about 10 minutes after contact with a metal, or about 30 minutes after contact with a metal. In some embodiments, the solid touchchromic device changes from a first color to a second color in about 1 second to about 30 minutes after contact with a metal. In addition, the solid touchchromic device can change from the second color back to the first color (e.g., upon removal of metal contact with the device) in about 30 seconds after metal contact has been removed, about 1 minute after metal contact has been removed, about 5 minutes after metal contact has been removed, about 10 minutes after metal contact has been removed, or about 30 minutes after metal contact has been removed. In some embodiments, the solid touchchromic device changes from the second color to the first color in about 30 seconds to about 30 minutes after metal contact has been removed. In some embodiments, the change back to the first color is longer than the initial change from the first color to the second color.

The solid touchchromic device may further include a salt. Examples of salts include, but are not limited to, sodium chloride (NaCl), cobalt chloride ($CoCl_2$), potassium chloride (KCl), magnesium chloride ($MgCl_2$), methyl magnesium chloride, lithium chloride (LiCl), lithium bromide (LiBr), lithium iodide (LiI), potassium bromide (KBr), potassium iodide (KI), lithium trifluoroacetate, isopropyl magnesium chloride, lithium chloride, lithium sulfate, lithium sulfate monohydrate, potassium acetate, sodium acetate, potassium aspartate, sodium aspartate, potassium malate, sodium acetate, ammonium acetate, pyridinium hydrochloride, lithium trifluoromethanesulfonate, $NaNO_3$, benzenediazonium chloride (diazonium salt), N-(1-butyl)pyridinium chloride, tetra-n-butylammonium fluoride, monosodium glutamate, phosphonates, hydrazinium salts, urates, diazonium salts, oxalate salts, triphenylmethyl hexafluorophosphate, tartrates, aluminum monostearate, triphenylmethyl hexafluorophosphate, tetrapropylammonium per ruthenate, sorbates, ammonium chloride, barium chlorate monohydrate, calcium chloride anhydrous, magnesium chloride anhydrous, magnesium chromate hydrate, magnesium iodide anhydrous beads, magnesium nitrate hexahydrate, magnesium sulfate, monohydrate ammonium sodium phosphate dibasic tetrahydrate, manganese(II) sulfate monohydrate, magnesium bromide hexahydrate, and magnesium iodate tetrahydrate. In some embodiments, the salt is selected from the group consisting of NaCl, $CoCl_2$, KCl, $MgCl_2$, and combinations thereof. In some embodiments, the salt is included in the solid electrolyte layer, the conductive polymer film, or both.

A. Solid Electrolyte Layer

The solid electrolyte layer can be derived from a polymer, an acid and an oxidant. The solid electrolyte layer provides advantages over presently used liquid electrolytes because using a liquid electrolyte can make it more difficult to fabricate practical touchchromic devices, such as window applications, for sunglasses, for sensors, and for detector applications. Accordingly, the solid electrolyte layer can provide a more robust application of the disclosed solid touchchromic devices compared to touchchromic devices that include a liquid electrolyte.

The solid electrolyte layer may include a gel derived from the polymer and the acid, which can be oxidized by the oxidant to provide an electron acceptor material. This electron acceptor material can be useful to the solid touchchromic device's ability to change colors. In some embodiments, the solid electrolyte layer comprises a gel derived from the polymer and the acid, the gel being oxidized by the oxidant. The solid electrolyte layer may also include water. In some embodiments, the solid electrolyte layer consists essentially of a gel derived from a polymer, an acid and an oxidant. In some embodiments, the solid electrolyte layer consists essentially of a gel derived from a polymer, an acid, an oxidant, and water.

The solid electrolyte layer can be derived from any polymer suitable for forming solid compatible structures (e.g., gels) that can be used in the solid touchchromic device. Examples of polymers include, but are not limited to, polyvinyl alcohol, poly(vinyl acetate), poly(vinyl alcohol co-vinyl acetate), poly(methyl methacrylate), poly(vinyl alcohol-co-ethylene ethylene), poly(vinyl butyral-co-vinyl alcohol-co-vinyl acetate), polyvinyl butyral, polyvinyl chloride, and polystyrene. Additionally, the polymers may be used in combination, and they may be combined in different proportions. In some embodiments, the solid electrolyte layer is derived from at least two different polymers.

In some embodiments, the polymer is selected from the group consisting of poly(vinyl alcohol) (PVA), poly(vinyl acetate), poly(vinyl alcohol co-vinyl acetate), poly(methyl methacrylate), poly(vinyl alcohol-co-ethylene ethylene), poly(vinyl butyral-co-vinyl alcohol-co-vinyl acetate), polyvinyl butyral, polyvinyl chloride, polystyrene, and combinations thereof. In some embodiments, the polymer is PVA.

The solid electrolyte layer can be derived from any acid that is suitable for use in the solid touchchromic device (e.g., an acid that can form gel-like structures with the polymers listed above). Examples include, but are not limited to, acetic acid, propionic acid, hydrochloric acid, hydrofluoric acid, phosphoric acid, sulfuric acid, formic acid, benzoic acid, hydrofluoric acid, nitric acid, phosphoric acid, sulfuric acid, tungstosilicic acid hydrate, hydriodic acid, carboxylic acids, dicarboxylic, tricarboxylic, oxalic acid, hexacarboxylic acid, citric acid, p-camphor sulfonic, $FeCl_3$ and polyacrylic, tartaric acid, and/or oxalic acid.

In some embodiments, the acid is selected from the group consisting of acetic acid, propionic acid, hydrochloric acid, hydrofluoric acid, phosphoric acid, sulfuric acid, formic acid, benzoic acid, hydrofluoric acid, nitric acid, phosphoric acid, sulfuric acid, tungstosilicic acid hydrate, hydriodic acid, carboxylic acid, dicarboxylic acid, tricarboxylic acid, oxalic acid, hexacarboxylic acid, citric acid, p-camphor sulfonic, a combination of $FeCl_3$ and polyacrylic acid, tartaric acid, oxalic acid, and combinations thereof.

The solid electrolyte layer can be derived from any oxidant that is suitable for use in the solid touchchromic device. For example, the oxidant can be a compound that can remove an electron(s) from the polymer, the polymer-acid gel, the conductive polymer or a combination thereof. Examples of oxidants include, but are not limited to, aluminum nitrate, ammonium dichromate, ammonium peroxydisulphate, barium nitrate, bismuth nitrate, calcium hypoperchlorate, copper (II) nitrate, cupric nitrate, ferric nitrate, hydrogen peroxide, lithium hydroxide monohydrate, magnesium nitrate, magnesium perchlorate, potassium chlorate, potassium dichromate, potassium permanganate, sodium hypochlorite, sodium periodate, zinc nitrate hydrate, nitric acid, sulfuric acid, perchloric acid, ammonium nitrate, silver nitrate, benzoyl peroxide, tetranitromethane, sodium perchlorate, potassium perchlorate, potassium permanganate, potassium persulfate, sodium nitrate, and potassium chromate.

In some embodiments, the oxidant is selected from the group consisting of aluminum nitrate, ammonium dichromate, ammonium peroxydisulphate (APS), barium nitrate, bismuth nitrate, calcium hypoperchlorate, copper (II) nitrate, cupric nitrate, ferric nitrate, hydrogen peroxide, lithium hydroxide monohydrate, magnesium nitrate, magnesium perchlorate, potassium chlorate, potassium dichromate, potassium permanganate, sodium hypochlorite, sodium periodate, zinc nitrate hydrate, nitric acid, sulfuric acid, perchloric acid, ammonium nitrate, silver nitrate, benzoyl peroxide, tetranitromethane, sodium perchlorate, potassium perchlorate, potassium permanganate, potassium persulfate, sodium nitrate, potassium chromate, and combinations thereof. In some embodiments, the oxidant comprises APS. In some embodiments, the oxidant is APS.

The solid electrolyte layer can be derived from varying amounts of oxidant. For example, the solid electrolyte layer can be derived from about 0.000001 M to about 0.1 M oxidant, such as about 0.00001 M to about 0.1 M oxidant, about 0.0001 M to about 0.1 M oxidant, or about 0.001 M to about 0.1 M oxidant. In some embodiments, the solid electrolyte layer can be derived from less than 0.1 M oxidant, less than 0.08 M oxidant, less than 0.05 M oxidant, or less than 0.01 M oxidant. In some embodiments, the solid electrolyte layer can be derived from greater than 0.0001 M oxidant, greater than 0.001M oxidant, greater than 0.01M oxidant, or greater than 0.1M oxidant.

In certain embodiments, the solid electrolyte layer is derived from poly(vinyl alcohol) (PVA), ammonium perdisulphate (APS) oxidant, and perchloric acid or hydrochloric acid. In some embodiments, the solid electrolyte layer consists essentially of PVA, APS oxidant, and perchloric acid.

The solid electrolyte layer may have a varying thickness. For example, the solid electrolyte layer may have a thickness of about 10 nm to about 1 μm. In addition, the solid electrolyte layer can be arranged in varying positions within the solid touchchromic device. As mentioned above, the solid electrolyte layer may be in contact with the conductive polymer film. The contact may be physical, electrical or both. In some embodiments, the solid electrolyte layer is in contact with the conductive polymer film and the conductive plate. In addition, embodiments that include a second conductive plate (as discussed below), the solid electrolyte layer may be in contact with the second conductive plate.

In another aspect, disclosed are compositions derived from poly(vinyl alcohol) (PVA), $H_3PO_4$, and ammonium peroxydisulphate (APS), wherein the composition is a gel. In some embodiments, the composition is the solid electrolyte layer.

B. Conductive Polymer Film

The conductive polymer film of the solid touchchromic device can include a conductive polymer. The conductive polymer, which can also be referred to as a conducting polymer, can be any polymer that is electrically conductive. Examples of conductive polymers include, but are not limited to, a polyaniline, a polypyrrole, a polythiophene, a polyindole, a polycarbazole, and combinations thereof. Examples of polyanilines include, but are not limited to, poly(ortho-anisidine) (POAS), poly(o-toluidine) (POT), poly(ethoxy-aniline), substituted polyanilines, and combinations thereof. In some embodiments, the polyaniline is selected from the group consisting of poly(ortho-anisidine) (POAS), poly(o-toluidine) (POT), poly(ethoxy-aniline), and combinations thereof.

Polyaniline can exist in a leucomeraldine state (faded yellow to transparent), an emeraldine state (blue to green), or a pernigraniline state (violet), each of which is reversible. Polyaniline requires two electrons and two hydrogen atoms to change from the pernigraniline state to the emeraldine state, and from the emeraldine to the leucomeraldine state, in the presence of an electric field or a solution containing an oxidizing or reducing agent. In some embodiments, the conductive polymer comprises a polyaniline. In some embodiments, the conductive polymer consists essentially of a polyaniline. In some embodiments, the conductive polymer is a polyaniline.

The conductive polymer film can be responsible for imparting a color (or lack thereof—e.g., transparent) to the solid touchchromic device. The conductive polymer film can be tuned to different desired colors by properly selecting the conductive polymer or a composite thereof, or a blend thereof. The conductive polymer by itself may have the ability to change color due to, e.g., changing oxidation states where each oxidation state corresponds to a different color. Accordingly, the conductive polymer may have more than one oxidation state. For example, the conductive polymer may have 2 to 4 oxidation states. In some embodiments, the conductive polymer has 3 oxidation states.

The conductive polymer film may also include other components (other than the conductive polymer) that can be useful in providing different colors for the solid touchchromic device, other than or in addition to the color(s) provided by the conductive polymer itself. For example, the conductive polymer film may further include a metal oxide, a dye or a combination thereof. Examples of metal oxides include, but are not limited to, $WO_3$, $SnO_2$, $In_2O_3$, $TiO_2$, and combinations thereof. Examples of dyes include, but are not limited to, rhodamine, congo red, eosin dye, methylene blue, methyl viologen, and combinations thereof. Embodiments where the conductive polymer film includes further components other than the conductive polymer may be referred to as a conductive polymer composite film herein.

Different combinations of the conductive polymer and the metal oxide or the dye may include, but are not limited to, a polyaniline-rhodamine composite; a polypyrrole-rhodamine composite; a polythiophene-rhodamine composite; derivatives of polyaniline with congo red; derivatives of polypyrrole with congo red; derivatives of polythiophene with congo red; a polyaniline-eosin dye composite; a polyaniline derivative-eosin dye composite; a polythiophene-eosin dye composite; a polythiophene derivative-eosin dye composite; a polyaniline-methylene blue composite; a polyaniline derivative-methylene blue composite; a polythiophene-methylene blue composite; a polythiophene derivative-methylene blue composite; a polyaniline-methyl viologen composite; a polyaniline derivative-methyl viologen composite; a polythiophene-methyl viologen composite; a polythiophene derivative-methyl viologen composite; derivatives of polyaniline with a metal oxide, including $WO_3$, $SnO_2$, $In_2O_3$, and $TiO_2$; derivatives of polypyrrole with a metal oxide, including $WO_3$, $SnO_2$, $In_2O_3$, and $TiO_2$; derivatives of polythiophene with a metal oxide, including $WO_3$, $SnO_2$, $In_2O_3$, and $TiO_2$; and/or derivatives of polycarbazole with a metal oxide, including $WO_3$, $SnO_2$, $In_2O_3$, and $TiO_2$. A suitable conducting polymer or conducting polymer composite may also include a combination of the above.

The conductive polymer and/or the conductive polymer with further components as listed above may be applied as a film to, e.g., the conductive plate. The conductive polymer or conductive polymer composite film may be deposited by electrochemical or self-assembled techniques as described in U.S. Pat. No. 9,684,218 and U.S. 2016/0109776, both of which are incorporated herein by reference in their entirety, or by any suitable method known in the art. The conductive polymer film may have a varying thickness. For example, the conductive polymer film may have a thickness of about 10 nm to about 1 μm. In some embodiments, the conductive polymer film may be referred to as a conductive polymer layer.

The conductive polymer film can be arranged in varying positions within the solid touchchromic device. In some embodiments, the conductive polymer film is positioned between the conductive plate and the solid electrolyte layer. In other embodiments, the conductive polymer film is positioned adjacent to the solid electrolyte layer, wherein both the conductive polymer film and the solid electrolyte layer are positioned on the conductive plate. The conductive polymer film may be contacting (e.g., physical, electrical or both) the solid electrolyte layer, the conductive plate, or both.

C. Conductive Plates

The conductive plates can be any suitable plate that allows the solid touchchromic device to function as disclosed herein. Examples of conductive plates include, but are not limited to, a conducting glass plate, a conducting plastic plate, an indium tin oxide (ITO) coated glass plate, an indium tin oxide (ITO) coated plastic, a fluorine doped tin oxide (FTO), and other metal oxides coated conducting plates. In some embodiments, the conductive plate is a metal oxide coated plate.

In some embodiments, the conductive plate is selected from the group consisting of an indium tin oxide (ITO) coated glass plate, an indium tin oxide (ITO) coated plastic plate, and a fluorine doped tin oxide (FTO) coated plate. In some embodiments, the conductive plate is a FTO coated plate. In some embodiments, the conductive plate is a FTO coated glass plate.

The conductive plate can be arranged in varying positions within the solid touchchromic device. The conductive plate may be considered one end of the solid touchchromic device, where the conductive polymer film can be positioned on the conductive plate. The conductive plate can contact (e.g., physical, electrical or both) the conductive polymer film or both the conductive polymer film and the solid electrolyte layer.

In some embodiments, the solid touchchromic device includes a second conductive plate. The second conductive plate can be positioned on the solid electrolyte layer such that the solid electrolyte layer and the conductive polymer film are positioned between the conductive plate and the second conductive plate. The second conductive plate may be the same type of plate as the conductive plate, or it may be different. In some embodiments, the second conductive plate is a FTO coated plate. In some embodiments, the conductive plate and the second conductive plate are both FTO plates.

D. Metal

The solid touchchromic device can further include a metal. The metal can act as a source of electrons that upon the metal contacting the solid electrolyte layer (or second conductive plate) can initiate a chain of reactions that results in the solid touchchromic device changing from a first color to a second color, the second color being different from the first color. Examples of metals include, but are not limited to, copper, low carbon steel, nickel, zinc, iron, indium, tin, aluminum, manganese, cobalt, palladium, silver, lithium, magnesium, sodium, and their alloys. In some embodiments, the metal is selected from the group consisting of copper, low carbon steel, nickel, zinc, iron, indium, tin, aluminum, manganese, cobalt, palladium, silver, lithium, magnesium, sodium, and combinations thereof.

In some embodiments, the solid touchchromic device comprises a metal configured to contact the solid electrolyte layer or the second conductive plate, wherein the solid touchchromic device changes from a first color to a second color in response to the metal contacting the solid electrolyte layer or the second conductive plate. The metal can be configured to alternately be placed into and out of contact with the solid electrolyte layer and/or the second conductive plate.

3. ARTICLES THAT INCLUDE THE SOLID TOUCHCHROMIC DEVICE

In another aspect, disclosed are articles that comprise the solid touchchromic device. Given that the disclosed solid touchchromic devices have the advantages of not needing an external power source and being able to change color in fast time scales, they can be useful for a number of different applications. Examples of applications where the solid touchchromic device could be useful include, but are not limited to, camouflage for the military and defense sectors, sensors, rear view mirrors for vehicles, windows, toys, and various displays applications.

In some embodiments, the article comprising a disclosed solid touchchromic device, can be selected from the group consisting of a sensor; a mirror, including a rear view mirror; a window; a toy; a display; a detector, sunglasses, and a form of camouflage, including camouflage for military applications.

4. METHODS OF MAKING SOLID TOUCHCHROMIC DEVICES

In another aspect, disclosed are methods of making solid touchchromic devices. The method may include applying a conductive polymer film to a conductive plate. As detailed above, the conductive polymer film or conductive polymer composite film may be deposited on the conductive plate by electrochemical or self-assembled techniques.

A polymer, an acid, and an oxidant may be combined to provide a mixture. Before being combined in the mixture, the polymer may be dissolved in a solvent, such as water, and then heated for a period of time to provide a polymer solution. For example, the polymer may be heated at less than 80° C. such as about 30° C. to about 70° C. for about 1 hour to about 8 hours. The acid can then be added to the polymer solution to provide the polymer-acid mixture. The oxidant can then be added to the polymer-acid mixture to provide the mixture. In some embodiments, the mixture is in the form of a gel.

The polymer, acid and oxidant may be present in the mixture at varying amounts. The polymer may be present in the mixture at about 10 gm/L to about 100 gm/L. The acid may be present in the mixture at about 0.00001 M to about 1 M. The oxidant may be present in the mixture at about 0.000001 M to about 0.1 M, such as about 0.00001 M to about 0.1 M, about 0.0001 M to about 0.1 M, or about 0.001 M to about 0.1 M. In some embodiments, the oxidant is present in the mixture at less than 0.1 M, less than 0.08 M, less than 0.05 M, or less than 0.01 M. In some embodiments, the oxidant is present in the mixture at greater than 0.0001 M, greater than 0.001 M, greater than 0.01 M, or greater than 0.1 M.

The mixture can be applied to the conductive polymer film to provide a solid electrolyte layer on the conductive polymer film, such that the conductive polymer film contacts the conductive plate and the solid electrolyte layer. The mixture can be applied as a gel to the conductive polymer film or may form a gel after being applied to the conductive polymer film. The solid electrolyte layer, conductive polymer film and conductive plate can then be heated at less than 80° C., such as about 30° C. to about 70° C. or about 40° C. to about 50° C. The heating step can be done for varying periods of time. For example, the heating can be performed for about 10 minutes to about 3 hours, such as about 30 minutes to about 2 hours or about 1 hour to about 2 hours. The solid electrolyte layer, conductive polymer film and conductive plate may also be exposed to a drying step (prior to the aforementioned heating step), which can be done at room temperature for about 1 hour. The color contrast of the solid touchchromic device may depend upon the ratio of polymer (e.g., PVA), oxidant (e.g., APS), and acid. In addition, different ways of making the solid touchchromic device, such as different heating/curing temperatures and times may also affect the color capabilities of the solid touchchromic device.

In some embodiments, the method further includes applying a second conductive plate to the solid electrolyte layer such that the solid electrolyte layer and the conductive polymer film are between the conductive plate and the second conductive plate. The second conductive plate is at least contacting the solid electrolyte layer. In some embodiments, the second conductive plate is contacting the solid electrolyte layer and the conductive polymer film. In still other embodiments, the second conductive plate is contacting the solid electrolyte layer, but not the conductive polymer film.

Generally, the above-description under the "Solid Touchchromic Devices" section regarding the solid electrolyte layer (including the polymer, the acid and the oxidant), the conductive polymer film, the conductive plate and the second conductive plate can also be applied to the methods of making the solid touchchromic device. For the purposes of brevity, this description will not be repeated here.

5. METHODS OF USING SOLID TOUCHCHROMIC DEVICES

In another aspect, disclosed are methods of using the solid touchchromic devices. The method may be used for any of the articles described above that comprise the solid touchchromic device as disclosed herein. The method may include contacting the solid electrolyte layer or the second conductive plate with the metal of the solid touchchromic device, wherein the solid touchchromic device changes from a first color to a second color in response to the metal contacting the solid electrolyte layer or the second conductive plate. The method then may optionally include moving the metal such that it no longer contacts the solid electrolyte layer or the second conductive plate, wherein the solid touchchromic device changes from the second color to the first color in response to the metal no longer contacting the solid electrolyte layer or the second conductive plate. These two steps can be repeated numerous times to repeatedly change the color of the solid touchchromic device.

6. EXAMPLES

Film fabrication: Initially, 0.1 M of aniline solution was added to 1 M HCl and stirred for 2 hr to produce a homogenous solution. The PANI (emeraldine form) was electrochemically deposited at 1 mA/cm$^2$ on a cell containing FTO coated glass plate as the working electrode and stainless steel as the counter electrode. The self-assembled PANI film was also deposited on FTO. A dye, methanol blue (MB), HCl, and a monomer aniline solution could also be produced by the addition of 0.01 M of MB and 5 ml of aniline in a 100 ml of 1 M HCl solution and stirred for 8 hr for a homogenous solution. The PANI-dye composite film was deposited using an electrochemical technique with a current density of 1 mA/cm$^2$ for 8 min. Later, the film containing composite granules was washed with water to obtain a uniform conducting polymer composite film on the FTO glass plate.

Figure 14:
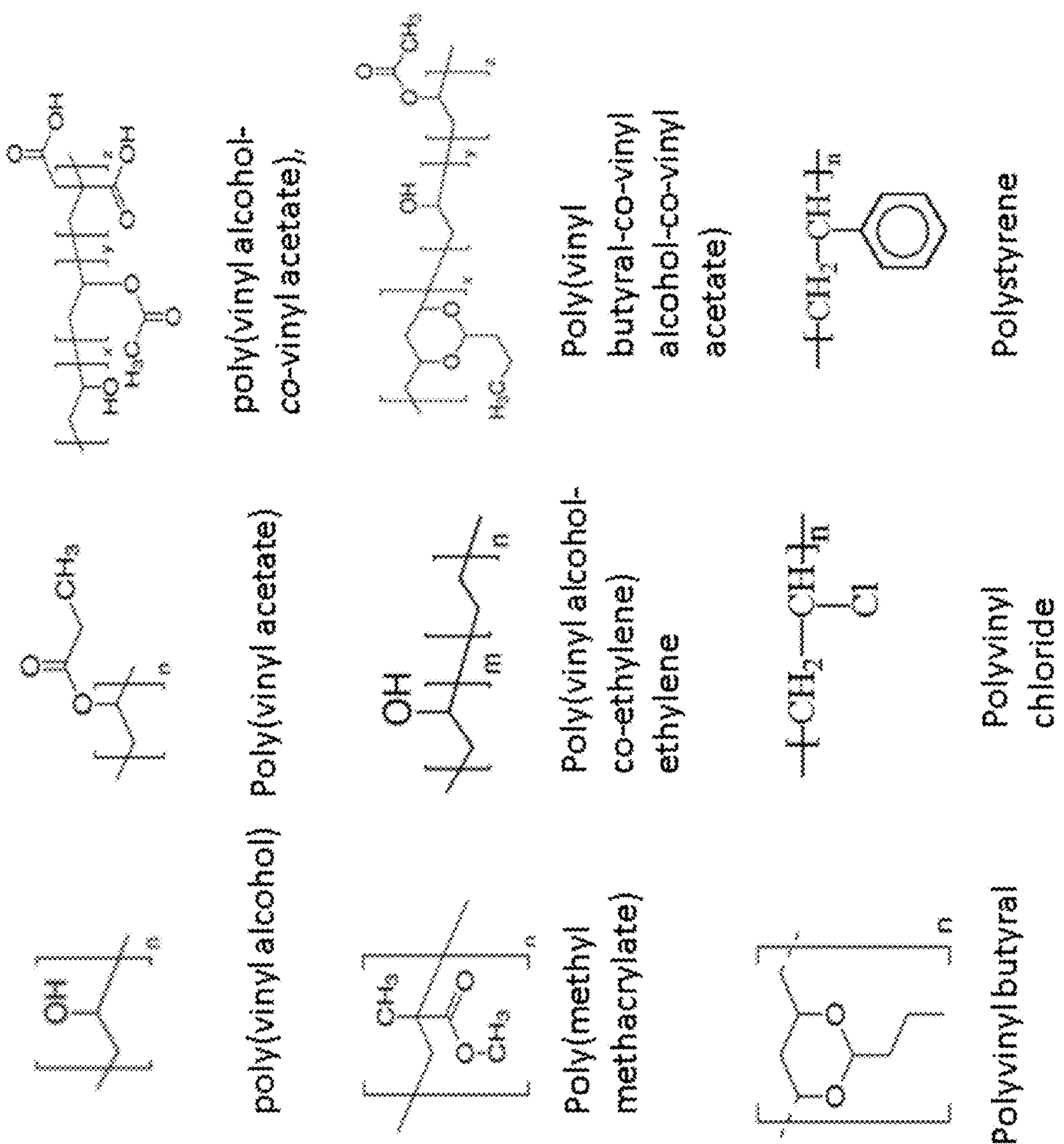
FIG. 14 shows chemical names and structures of polymers that can be used to fabricate solid electrolyte layers.
Figure 15:
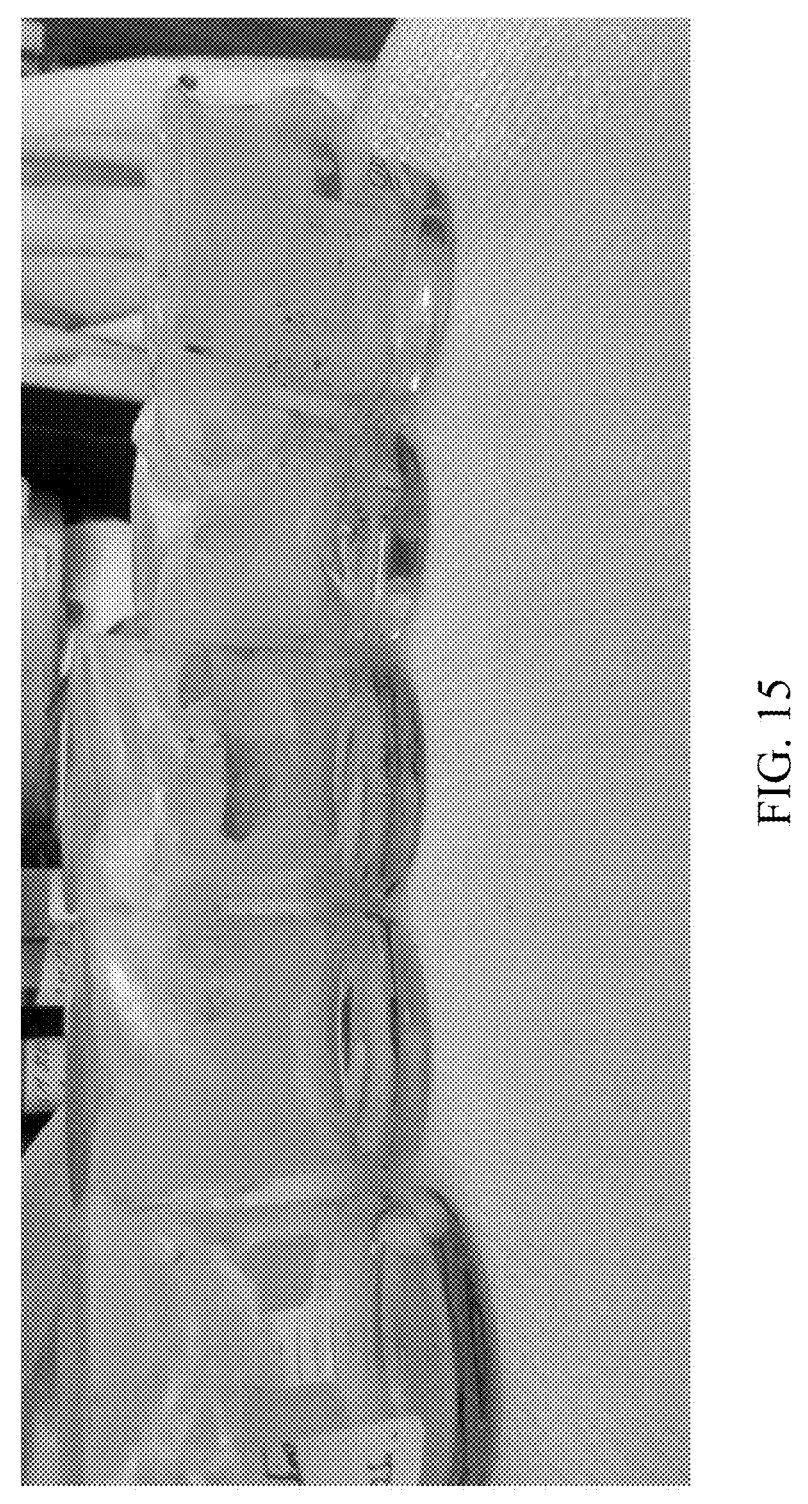

Preparation of the PVA-HCl solution: 20 gm of PVA was dissolved in deionized water and adjusted to produce 250 ml. The solution was first heated at 70° C. for 8 hr. Then, the PVA solution was divided into five parts (each 50 ml), with each part adjusted in a beaker by the addition of different molar concentrations (2 M to 0.125 M—FIG. 15) of acid solution. Other polymer that may be used in place of or in combination with PVA include examples shown in FIG. 14.

Preparation of liquid electrolyte: The liquid electrolyte was prepared by the addition of an APS oxidant at 0.1 M to various molar ratios of acid varied from 2 M to 0.125 M (FIG. 16).

TABLE 1

PVA at different molar concentrations of HCl

| Sr No. | PVA Solution | HCl Concentration |
|---|---|---|
| A | 40 mL | 2M |
| B | 40 mL | 1M |
| C | 40 mL | 0.5M |
| D | 40 mL | 0.25M |
| E | 40 mL | 0.125M |

Each PVA solution may be adjusted by addition of different molar concentrations (about 2 M to about 0.125 M) of HCl solution, as shown in Table 1.

A liquid electrolyte may be prepared by addition of the oxidant APS at about 0.1 M with various molar ratios of HCl, varying from about 2 M to about 0.125 M.

TABLE 2

Concentration of APS to HCl concentration

| Sr No. | APS Concentration | HCl Concentration |
|---|---|---|
| 1 | 0.1M | 2M |
| 2 | 0.1M | 1M |
| 3 | 0.1M | 0.5M |
| 4 | 0.1M | 0.25M |
| 5 | 0.1M | 0.125M |

Figure 17:
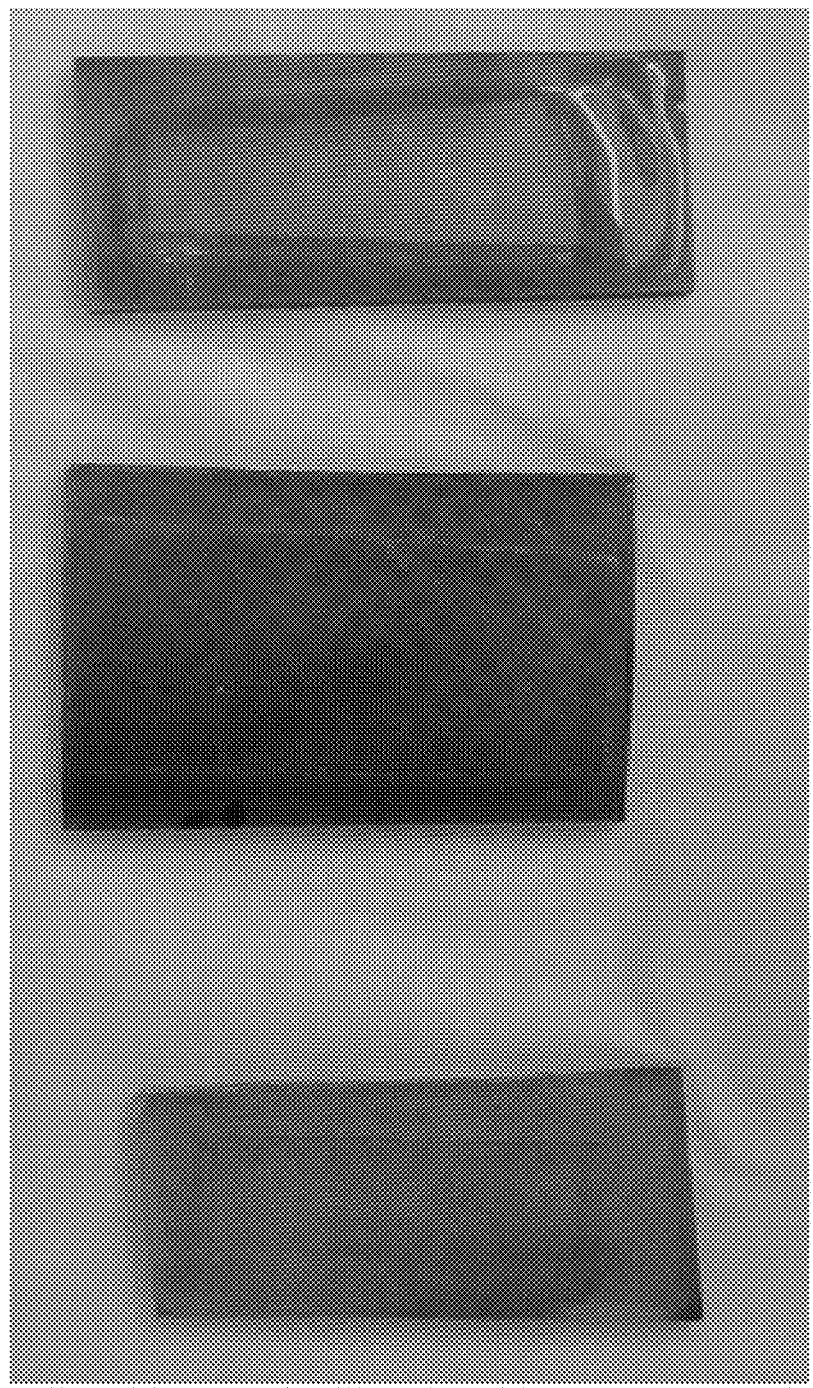
FIG. 17 is an image showing different concentrations of electrolyte layer over PANI films on ITO coated glass plates.
Figure 18:
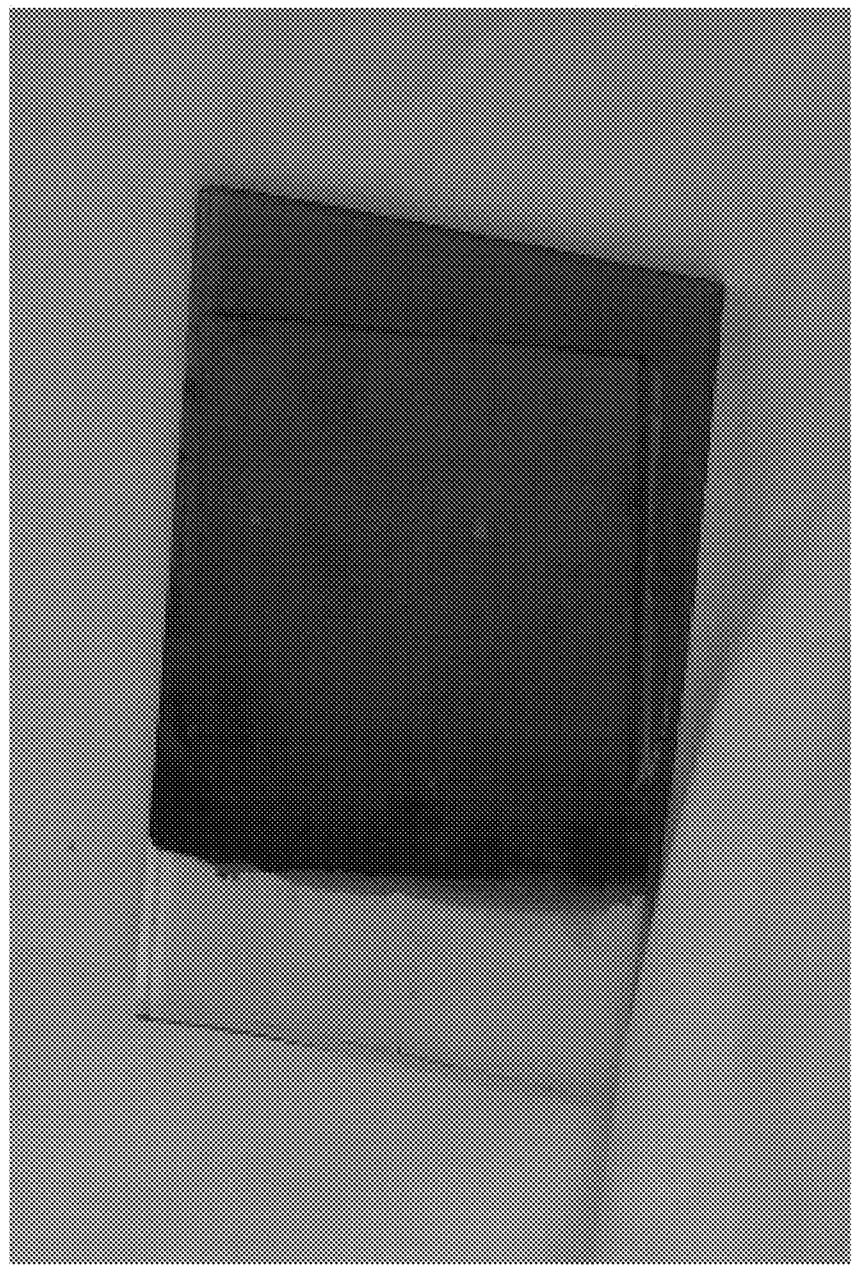
FIG. 18 is an image showing a fabricated solid touchchromic device.

A solid device (see, e.g., FIG. 18) may be fabricated according to the following procedure, although many variations will be readily apparent to one of skill in the art. Each container with equal concentration of acid with PVA, as shown in Table 1 and Table 2, may be mixed to obtain various homogenous solutions. Such electrolytes may be used to form a film of PANI coated over FTO or ITO coated glass plates. A transparent glass slide or an ITO coated glass plate may be placed over the liquid electrolyte coated over PANI film on ITO glass plate. The glass slide or ITO coated glass slide may be smaller in size over liquid electrolyte coated over PANI film on ITO glass plate. Three different concentrations of liquid electrolyte treated and covered over PANI films on ITO coated glass plates are shown in FIG. 17.

Figure 6:
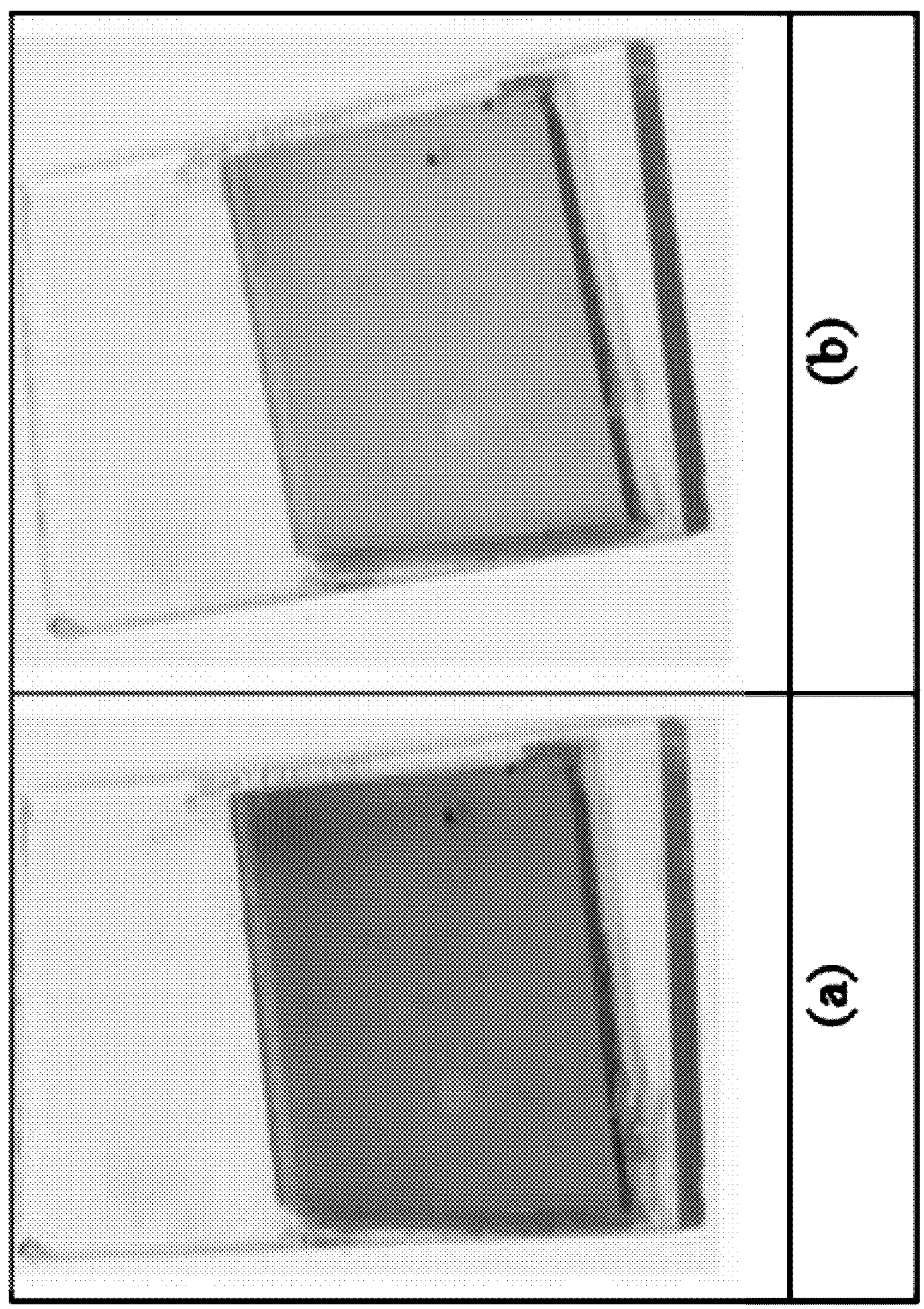
FIG. 6 illustrates images of solid layer electrolyte touchchromic films: (a) before metal contacts (colored state); and (b) after metal contact (transparent state).

Another device fabrication included: Each container with the same concentration of HCl was mixed with PVA to obtain various homogenous solutions. The resultant electrolyte was applied to the PANI film on the FTO glass plate. Finally, a transparent glass slide or an FTO-coated glass plate was placed over the liquid electrolyte. The structure was first dried at room temperature for one hour and then dried in an oven at 40-50° C. to produce a solid touchchromic device. FIG. 6 shows the fabricated solid electrolyte touchchromic device. The concentration of the electrolyte, containing the synthetic polymer PVA, APS oxidant, and HCl acid greatly affected the PANI or its composite film.

The APS oxidant in the electrolyte converted the ES form of PANI to PNB; however, if it was not used in the right proportions, the electrolyte reacted with the PANI structure and caused film discoloration. The concentrations of the electrolyte containing synthetic polymer "PVA", APS "oxidant", and acid "HCl" can have a significant effect on the PANI film. Thus, the ratios between APS, PVA, and HCl played an important role in the fabrication of the solid touchchromic device.

Figure 19:
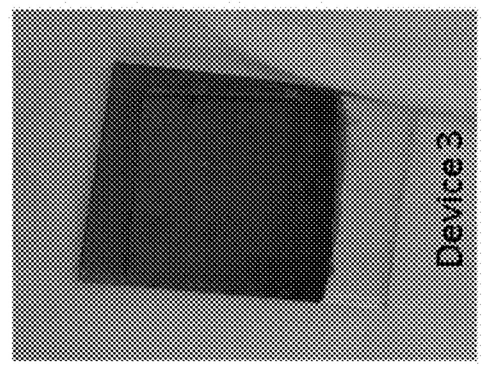
FIG. 19 is images showing solid touchchromic devices fabricated using different concentrations of PVA, APS, and HCl in electrolyte.
Figure 19:
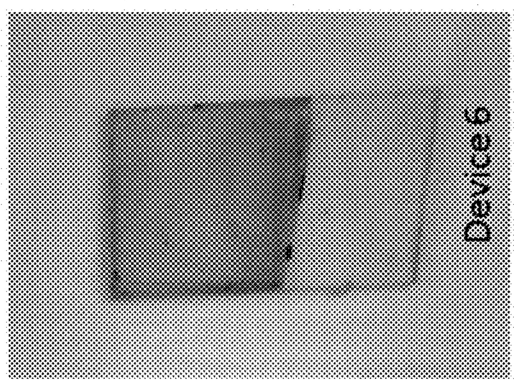
Figure 19:
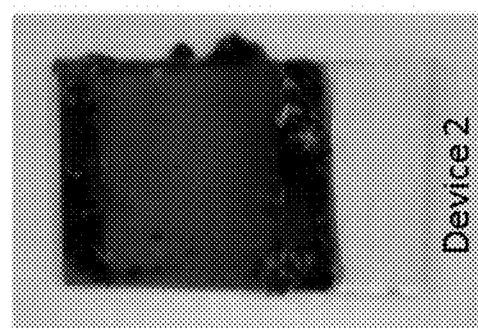
Figure 19:
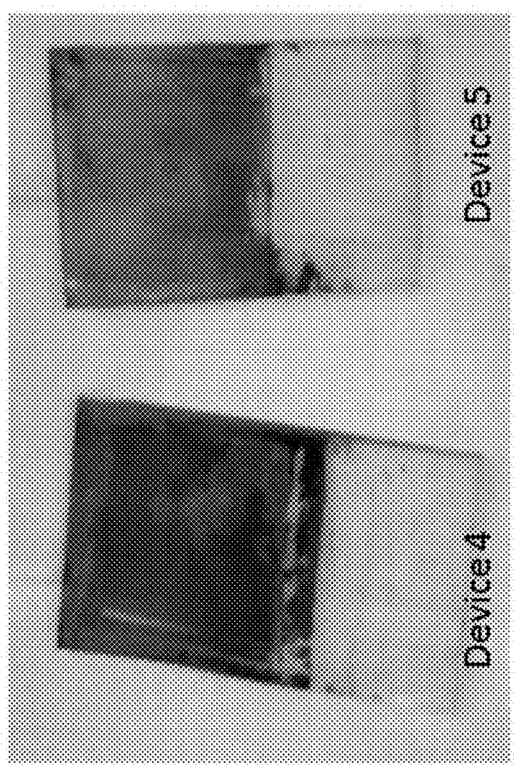
Figure 19:
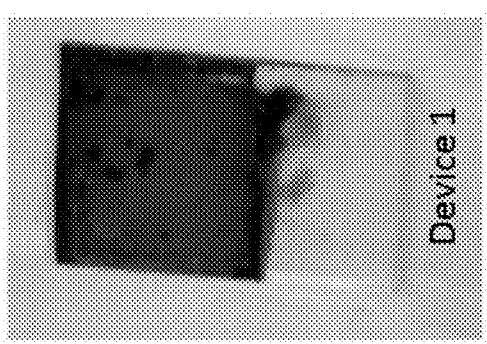
Figure 19:
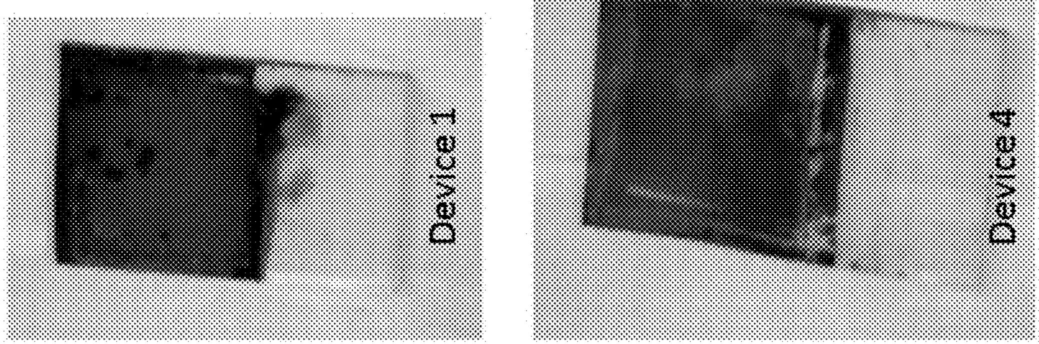

For example, the APS "oxidant" in the electrolyte brings emeraldine salt polymer to PNB. However, if it is not used in a good proportion in the electrolyte, it reacts to PANI structure and causes discoloration of the film as shows in FIG. 19. The top three touchchromic devices (1-3) in FIG. 19 have no effect of oxidant. However, the bottom three touchchromic devices (4-6) depict a color change of the film due to the presence of higher concentration of oxidant in the electrolyte. Thus, it was important to keep the APS concentration at less than 0.1 M for the fabrication of such devices.

Figure 3:
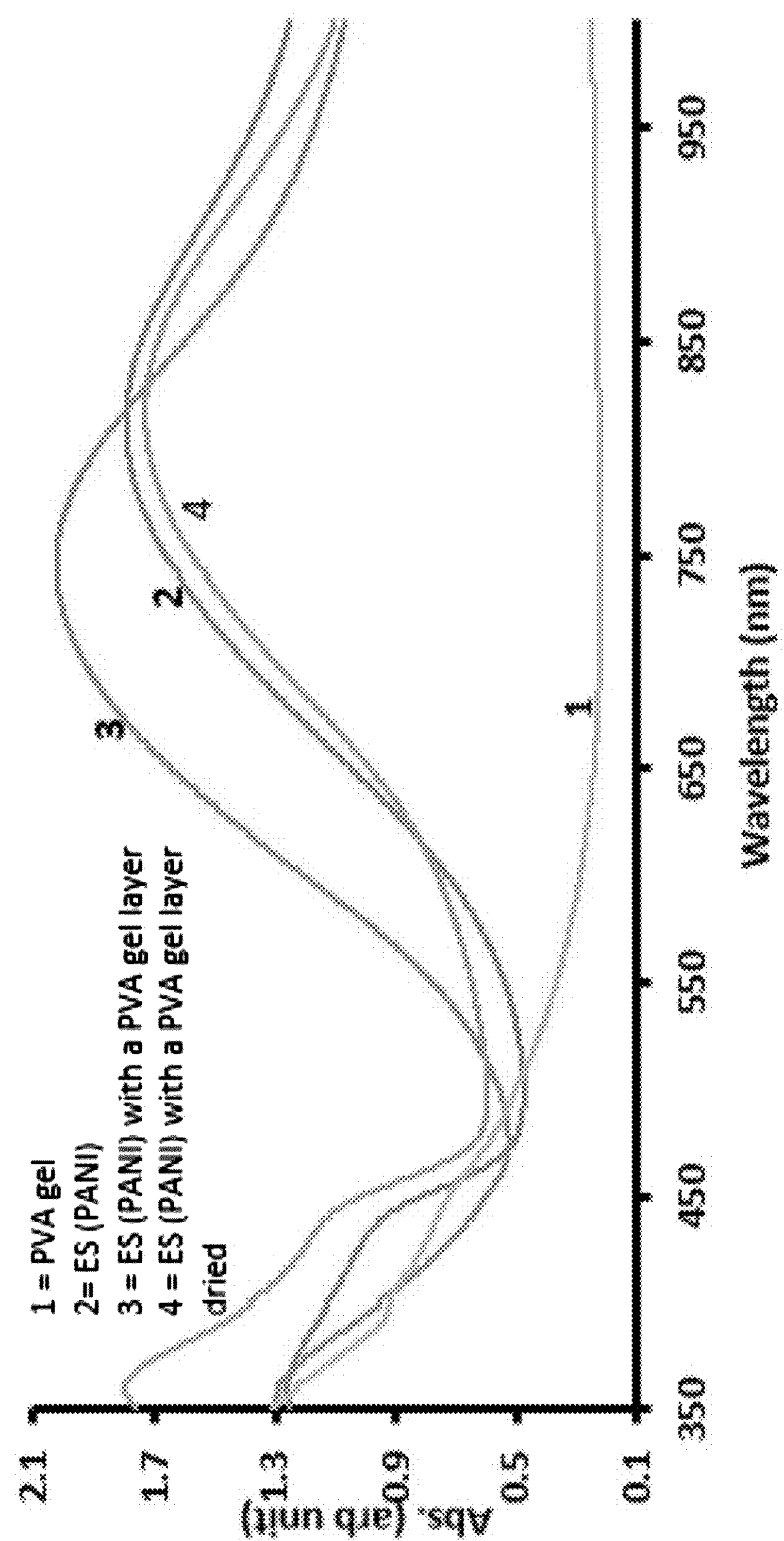
FIG. 3 illustrates ultra violet (UV)-visible spectra where the data marked 1 is for PVA; 2 is for emeraldine salt (ES); 3 is for ES covered with PVA-based gel; and 4 is for ES with a cured PVA gel layer.

UV-studies: FIG. 3 (curve 1) graphically shows that the PVA containing both HCl and APS has an absorption peak at 350-360 nm due to the conjugation bond of the acid with the PVA. The presence of the absorption band at 460 nm was due to the free OH group which was in equilibrium with the HCl acid group in the blend structure. FIG. 3 (curve 2) graphically shows the UV-vis bands at 362 nm, 430 nm, and 820 nm of the emeraldine salt (ES) form of PANI. The band at 362 nm was due to a $\pi$-$\pi^*$ transition, the band at 420 nm was due to the polaron and bipolaron states whereas the band at 820 nm was due to the doped form of PANI. The electrolyte layer applied to the ES shows UV-absorption peaks at 360 and 750 nm in curve 3 of FIG. 3. The band has shifted from 362 nm to 360 nm with the removal of the polaron and bipolaron states. The HCl concentration in ES has also decreased as indicated by the shift of the band at 750 nm. FIG. 3 (curve 4) depicts interesting bands at 365, 443, and 813 nm. The sharp band for the polaron and bipolaron states at 443 nm again appeared and the doped band shifted to 813 nm. The UV-vis spectra (FIG. 3) show that the "APS" oxidizer had an effect on the activity of the solid electrolyte deposited on the PANI film.

Figure 4:
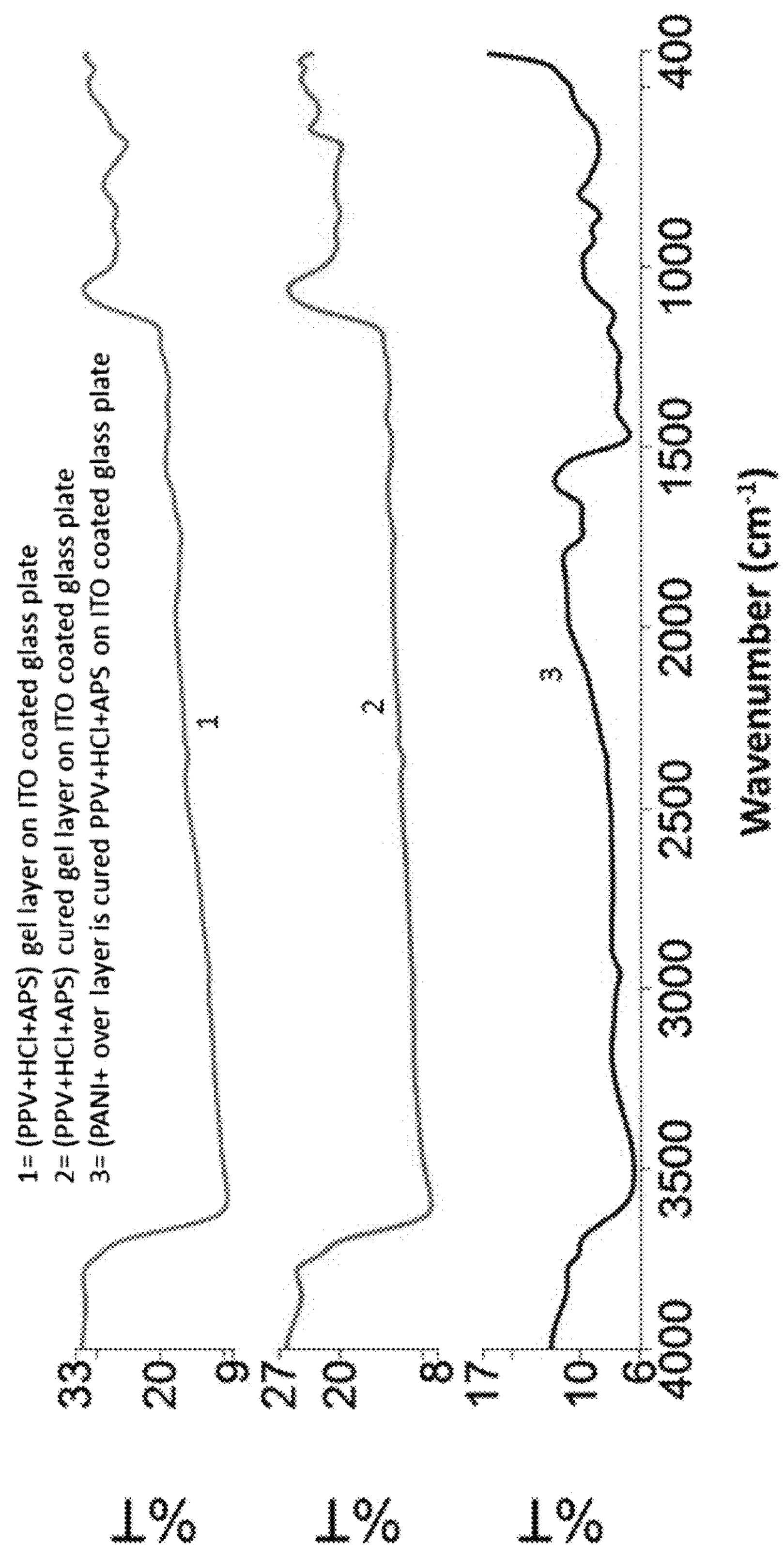
FIG. 4 illustrates FTIR spectra where the data marked 1 is for PVA gel including PVA, HCl and APS; 2 is for heat cured PVA gel including PVA, HCl and APS; and 3 is for cured PVA gel including PVA, HCl and APS on polyaniline (PANT) film and FTO coated glass plate.

FTIR: FIG. 4 (curve 1) graphically shows the FTIR spectra of PVA-gel (made of PVA+APS+HCl) coated over an FTO coated glass plate. The spectra were recorded using the reflectance mode. FIG. 4 curve 2 shows FTIR spectra of heat cured PVA-gel on the FTO coated glass plate. There is no significant variation in the infrared peak either in the liquid or solid form deposited on the FTO coated glass plate. However, the cured PVA gel on PANI shows the mixed bands of PANI and PVA in curve 3 of FIG. 4.

Figure 5:
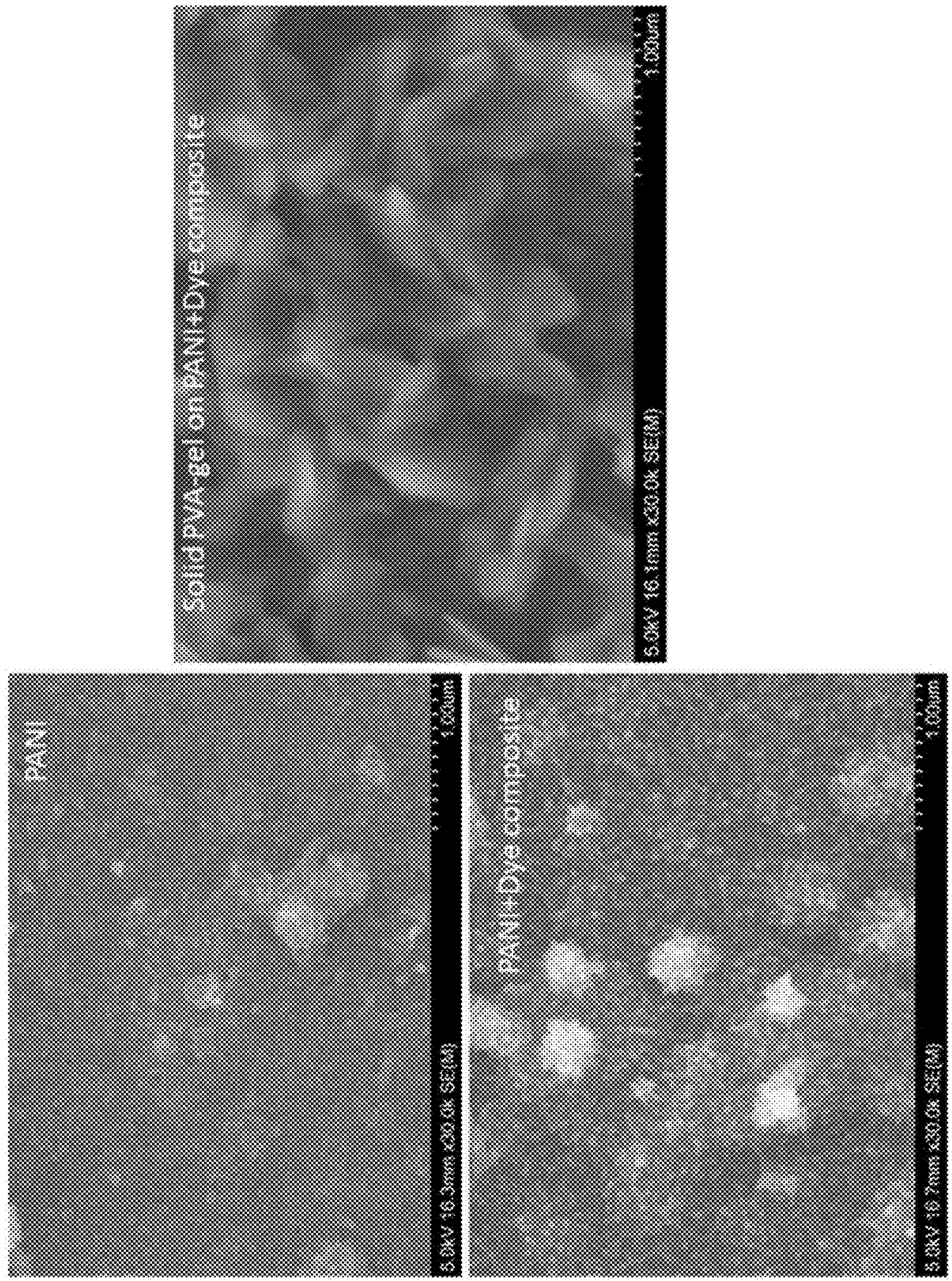
FIG. 5 illustrates scanning electron microscopy (SEM) images of PANI, PANI with dye composite, and PVA gel including acid and oxidant on PANI with dye composite.

SEM: FIG. 5 shows SEM images of PANI (1), PANI+dye composite (2), and solid PVA-gel over PANI+dye. FIG. 5 (picture 1) shows uniform PANI films, whereas when a dye is incorporated it turns into a clay-like structure. A solid electrolyte over the PANI+dye produced a fibril type structure. The change in the orientation and concentration of the fibril structure in the film may be due to the different thicknesses of the solid electrolyte layer over the PANI film. The doctor blade technique was used to apply a PVA-gel electrolyte uniformly over the film.

UV-vis transmission at 550 nm: The UV-vis transmission of the solid touchchromic device with and without a metal contact was obtained. The color contrast varied from about 20 to about 50% depending upon the type of film, concentration of the gel, and thickness of the smart film.

Visual observation of touchchromism: The metal pin contact was applied on the electrolyte of the solid touchchromic device including of PVA-gel on PANI/FTO glass. Removal of the metal pin brought back the original color. FIG. 6 shows images of the touchchromic device before and after removing the metal contact.

Figure 20:
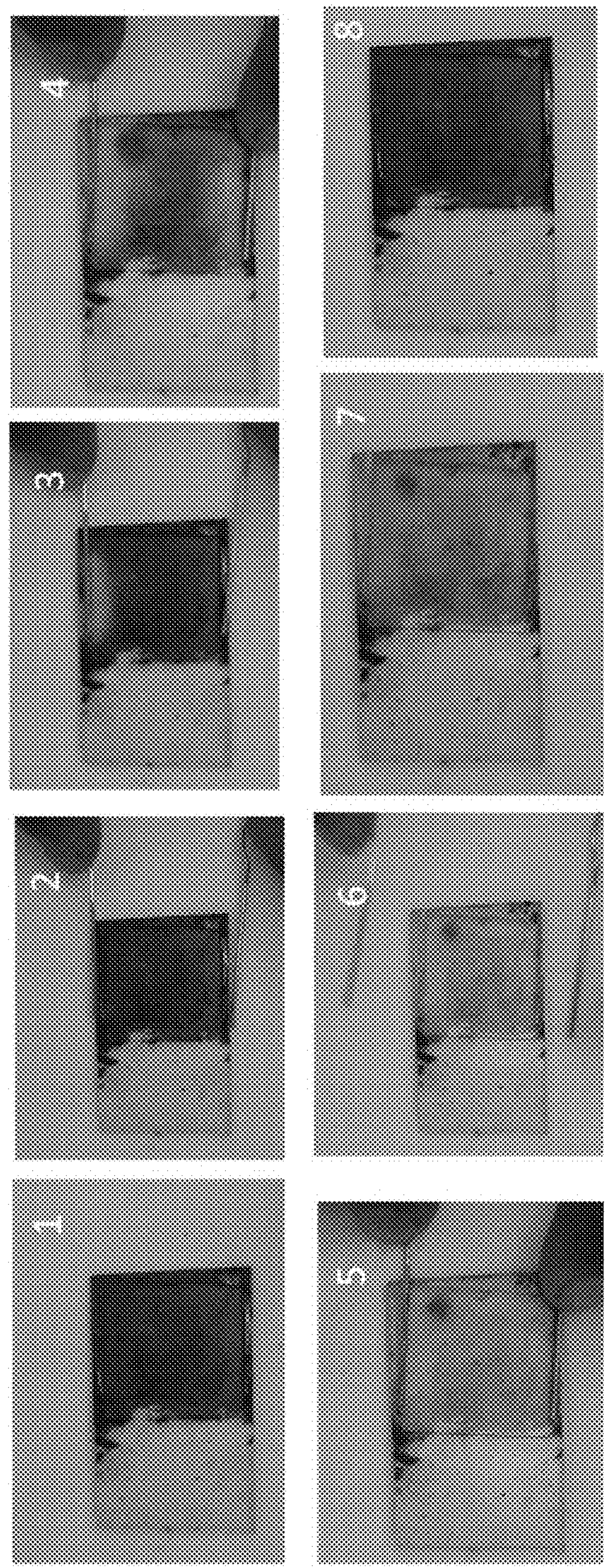
FIG. 20 is still frame images from a video of metal pin contact to a solid touchchromic device and removal and subsequent decoloration and coloration, respectively. An intermediate state can also be seen.

FIG. 20 shows pictures extracted from a video for the decoloration and coloration with metal contact. (1) The solid device. (2) The metal pin is closer to device. (3) The pin has touched the right side of the glass edge of PVA solid electrolyte. (4) The device shows a color change when both pins are in contact. (5) The device has completely changed color in a few seconds of contact. (6) The pin is removed, and the film has started to change back. (7) The film is in an intermediate stage of color change. (8) The device has approached its original color after a couple of minutes.

Figure 7:
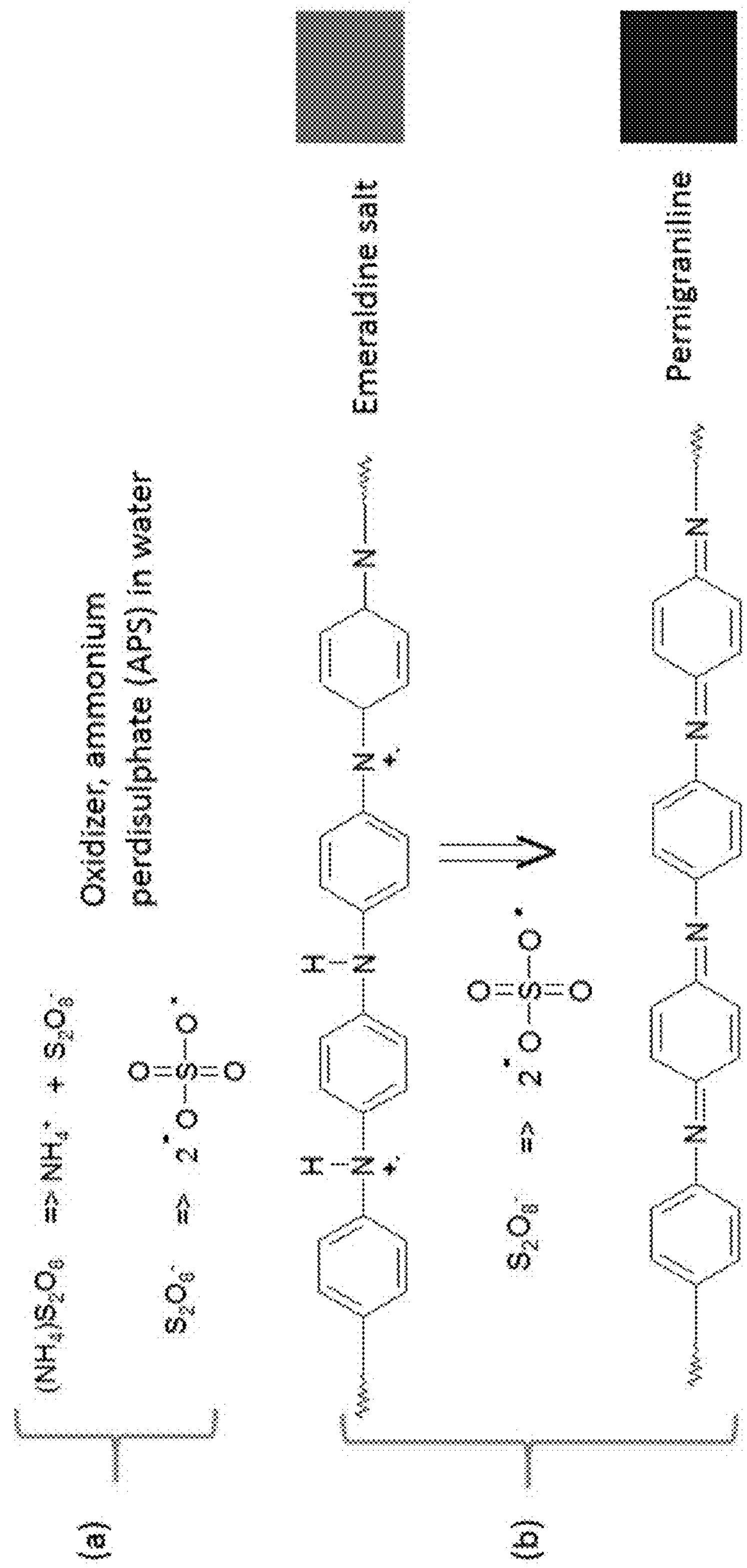
FIG. 7 is a schematic showing (a) APS in water, including reactive persulphate ions; and (b) the persulphate ion changing emeraldine salt (ES) to a pernigraniline (PNB) state of PANI.

FIG. 7 shows the emeraldine salt as the doped form of the PANI structure. The oxidant APS changes emeraldine salt to the PNB state of PANI. HCl and phosphoric acid ($H_3PO_4$) have been used in the PVA-gel based electrolyte. Because the gelling process of PVA has been studied in $H_3PO_4$, $H_3PO_4$ was used to show the preparation of the PVA-gel electrolyte, its treatment over PANI, and preparation of the solid device and the touchchromic mechanism. Instead of $H_3PO_4$, other similar acids could be used, such as HCl, $H_2SO_4$, $HNO_3$, $CH_3COOH$, for example.

Figure 8:
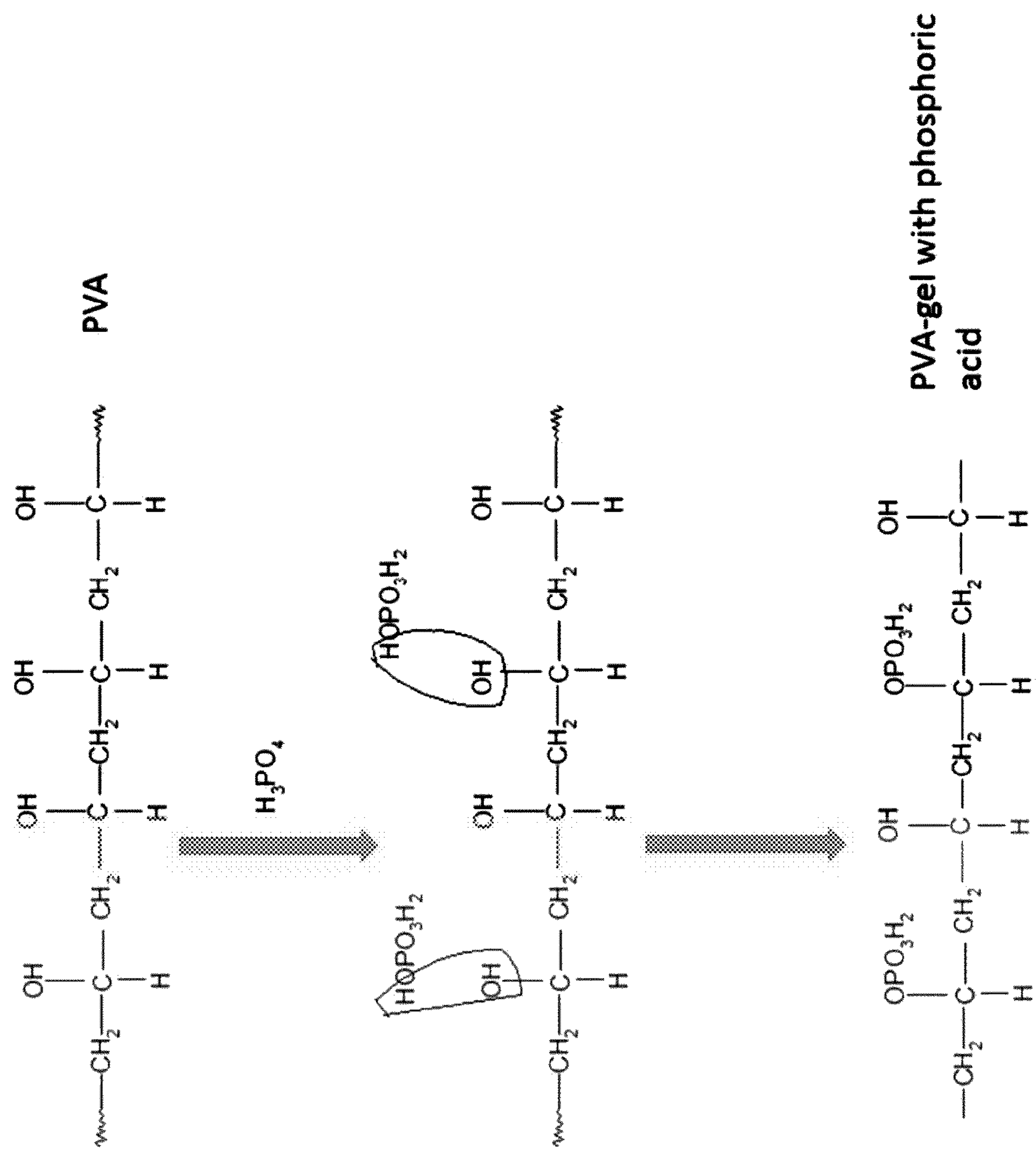
FIG. 8 is a schematic showing the formation of gel electrolyte by introduction of phosphoric acid ($H_3PO_4$) in PVA.
Figure 9:
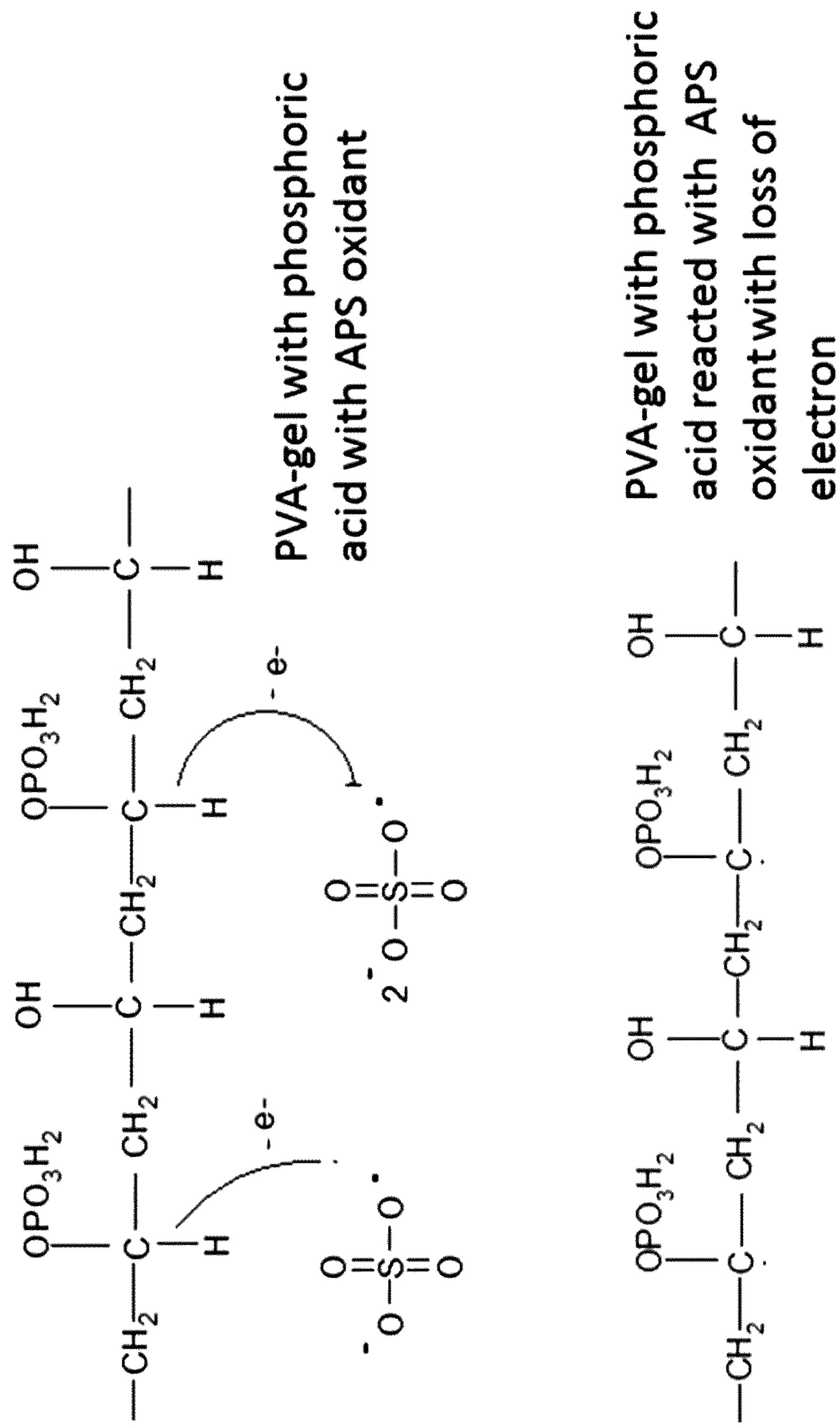
FIG. 9 is a schematic showing radical formation in PVA after treatment with APS.

The schematic in FIG. 8 illustrates the formation of PVA-gel in $H_3PO_4$. PVA blended well with $H_3PO_4$ when heated at 70° C. for 2 hr. It was important to form a transparent gel by keeping the temperature below 80° C., otherwise the gel would become dark and brownish. Longer annealing times were avoided and the temperature was decreased to 50° C., enabling the PVA solution to remain transparent. FIG. 9 shows the formation of radical carbon atoms in the PVA structure in the gel with the use of the APS oxidant. The APS oxidant removes an electron from the PVA-$H_3PO_4$ structure, producing an electron acceptor material. However, metal contact removal reverses the process, and the presence of APS in the PVA+$H_3PO_4$+APS structure removes electrons from PVA as well as LEU. The film changes to dark blue or blue forming leucomeraldine form of PANI. The coloration process may be slower than the decoloration process.

Figure 10:
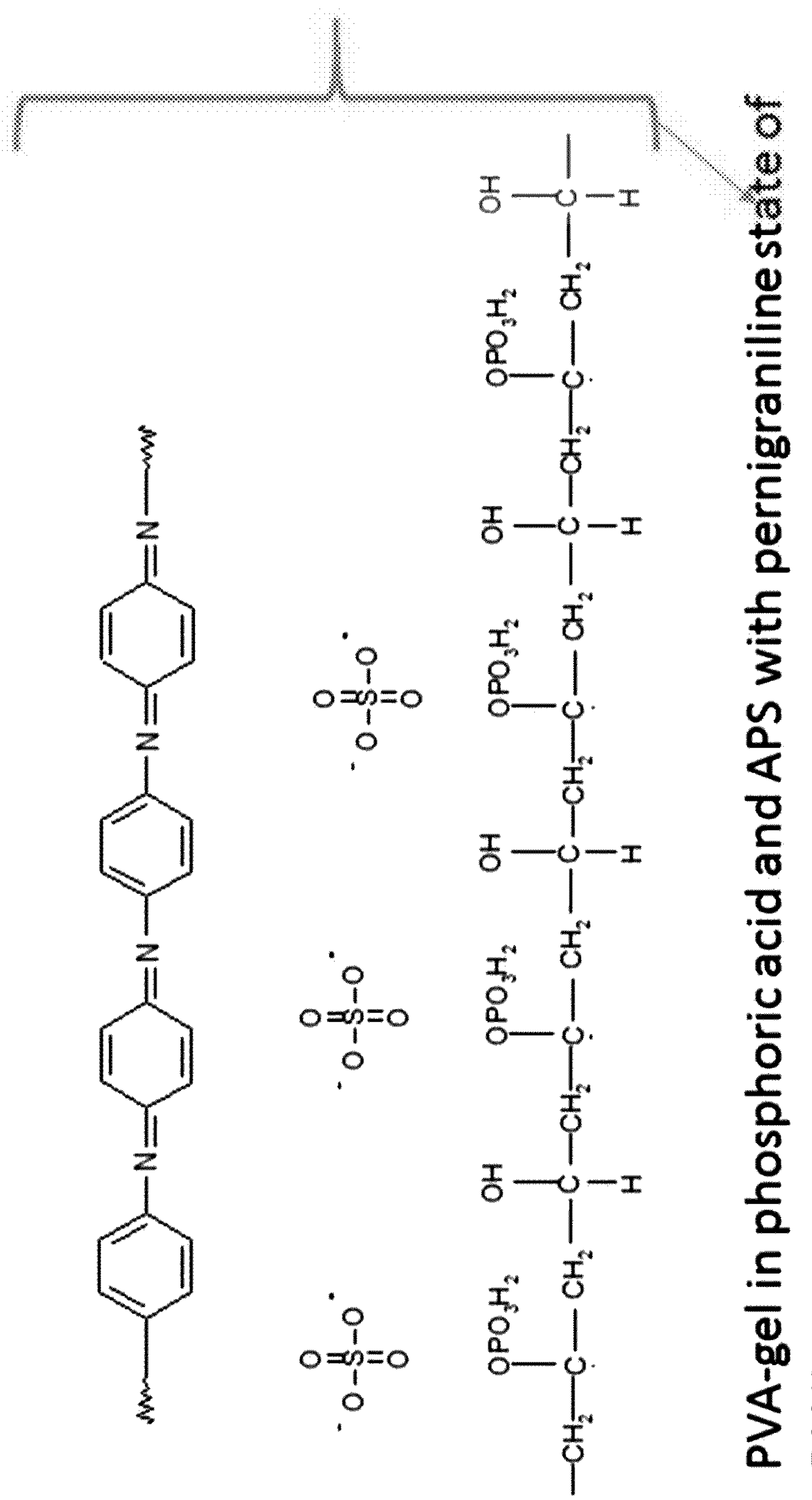
FIG. 10 is a schematic showing a stable state of PNB in the PVA gel (PVA+$H_3PO_4$+APS).

The PVA-PANI-ZnO composite powder has been previously synthesized for antibacterial applications. The PVA-PANI-nickel nanocomposite treated with a gamma radiolytic method showed an increase of conductivity with dose. PANI-PVA composite films have been synthesized to obtain good conductivity and mechanical properties. In addition, a solid-based PVA-sodium bromide-$H_3PO_4$ membrane has been fabricated by the solution casting method for fuel cell applications. However, the adhesive properties of a PVA-PANI layer or the application of a PVA+$H_3PO_4$+APS type electrolyte has not been previously reported. FIG. 10 shows the resultant structure when the PVA-gel is applied on the PANI film and the PANI color changes to dark blue or purple. There is a four order of magnitude change in the conductivity of the solid electrolyte from 100 S/cm for just PANI, to $10^{-2}$ S/cm for the PVA+$H_3PO_4$+APS gel treated PANI film.

Figure 11:
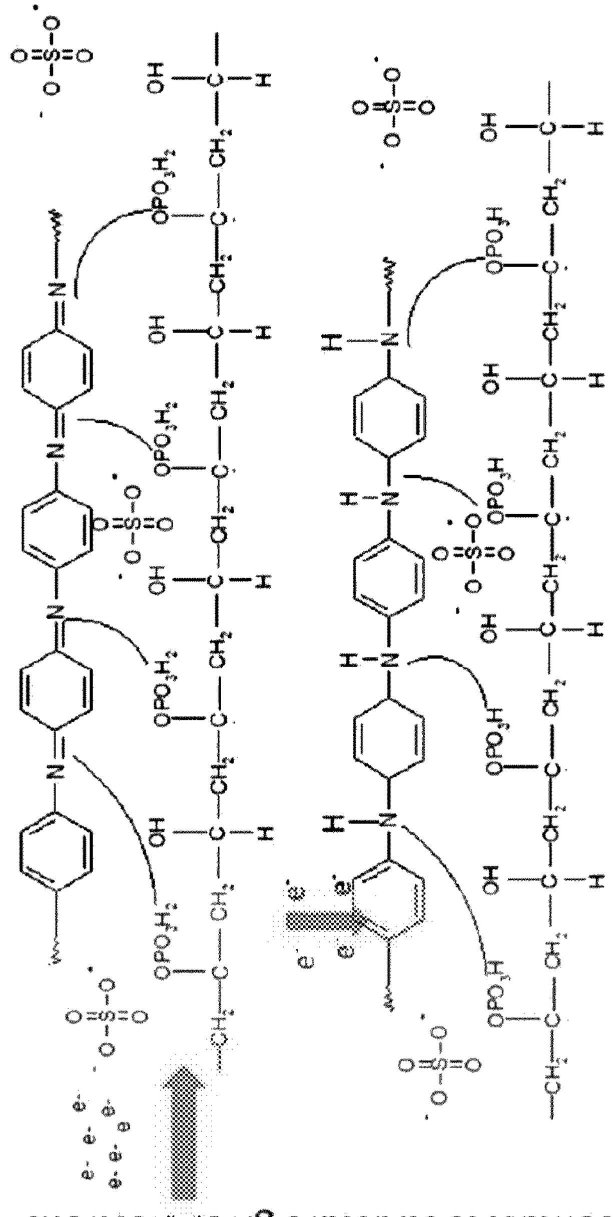
FIG. 11 is a schematic showing the change of PNB to leucoemeraldine (LEU) when a metal touches the solid electrolyte layer.
Figure 11:
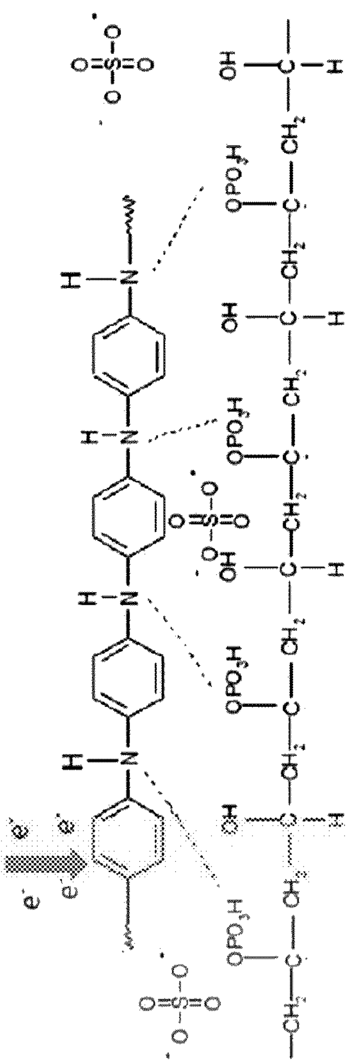

This is opposite to the conductivity obtained when only PVA with acid was applied to PANI. FIG. 11 shows how the electron flows from the metal into the PNB film after contact with the PVA-gel electrolyte. The formation of a radical at the carbon atom in the PVA structure was the result of electron transfer with the reaction proceeding from PNB to LEU with a weak interaction with the phosphoric acid group.

Figure 12:
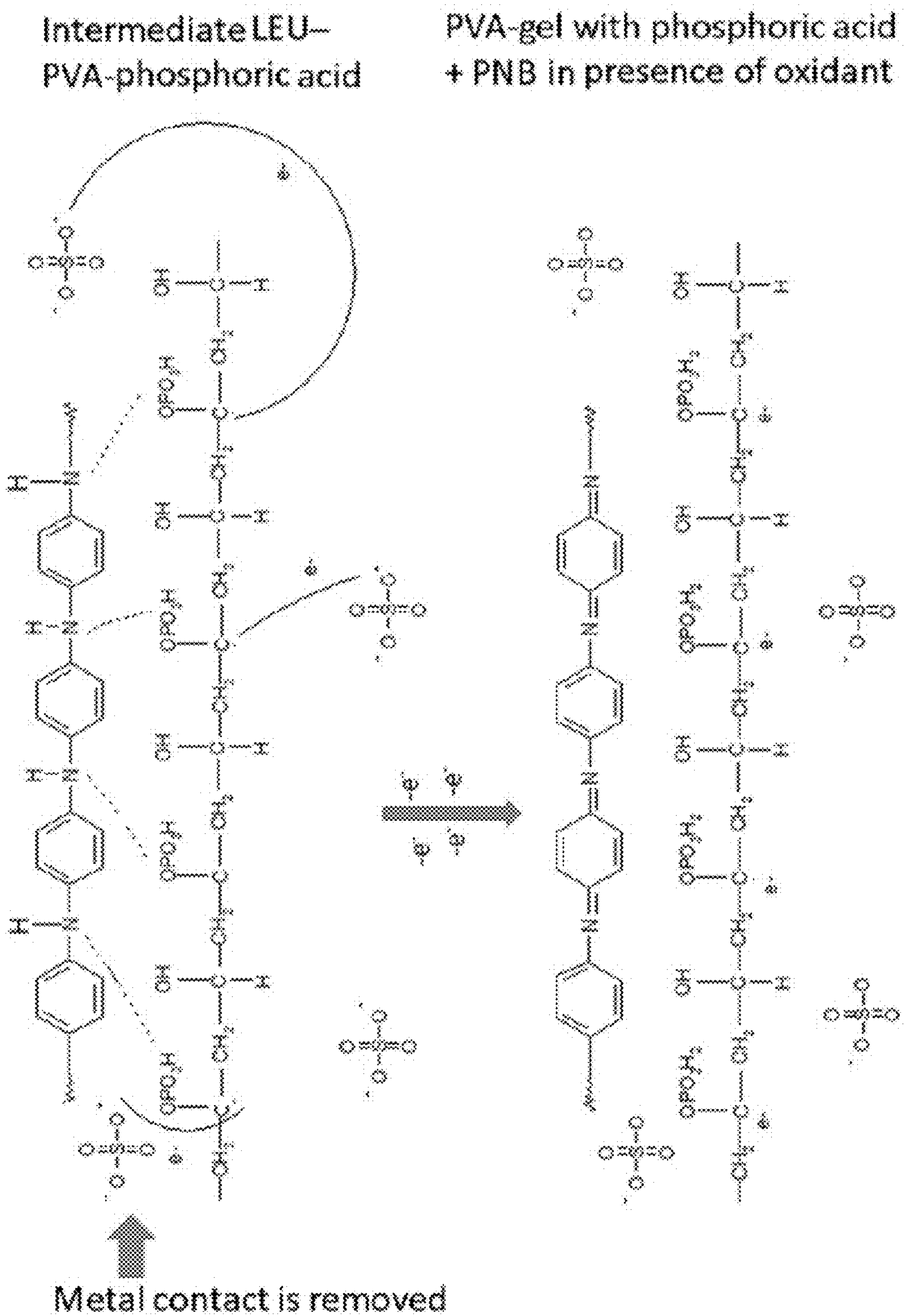
FIG. 12 is a schematic showing the systematic change of LEU to PNB.

A metal contact brings a complete change of the PNB form of PANI to LEU, as shown in FIG. 12. Removal of the metal contact reversed the process, with the APS in the PVA-gel structure removing electrons from the PVA and LEU to form PNB (dark blue in color). The coloration process was slower than the decoloration process. It is hypothesized that any excess electrons removed from the smart film are distributed to the environment to keep the charge balanced. The coloration and decoloration process was completely reversible. One could conclude that the coloration and decoloration process in solid electrolyte devices is quite different than that in liquid electrolyte touchchromic devices.

Figure 13:
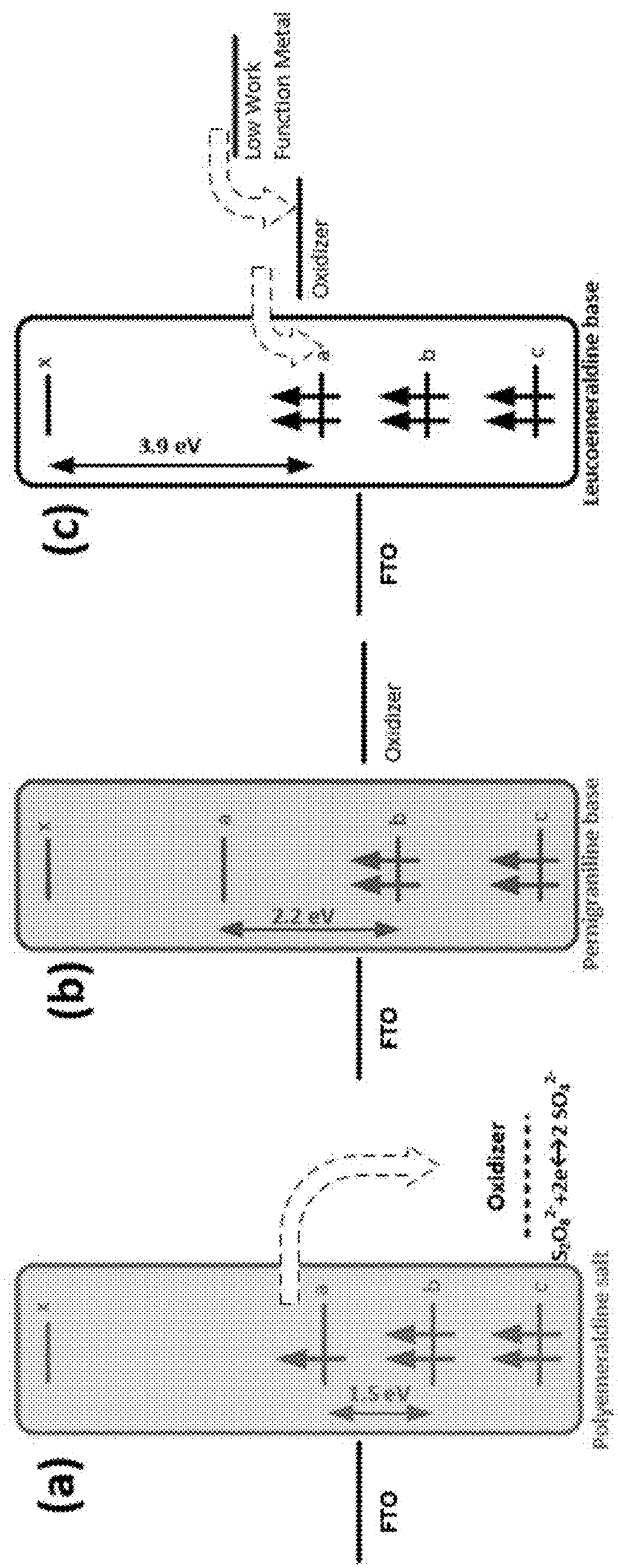
FIG. 13 is a schematic showing: (a) relative energy levels in FTO, ES, and the standard electrochemical potential for the redox couple of $S_2O_8^{2-}$ and $50_4^{2-}$; (b) an equilibrium state of FTO-PANI-solid layer electrolyte. The polymer electron loss converts the polymer state to PNB with a blue color; and (c) how contact of the solid electrolyte with a low work function metal converts the polymer state from PNB to transparent LEU form.

Energy band diagram: The energy structure in a touchchromic device was obtained using theories for solid-state and electrochemical devices. FIG. 13 shows the proposed energy structures for FTO, PANI, and gel electrolyte with and without the metal contact, based on the energy levels of PANI at different oxidation states. The deposited polymer on the FTO substrate was emeraldine salt with a green color (band gap about 1.5 eV). The standard electrochemical potential of the oxidizer was much lower than the Fermi level in PANI ($E_0$ about 6.5 eV below vacuum). Hence, electron transfer from PANI to the oxidizer was expected for the PVA gel including PVA+$H_3PO_4$+APS. The electron transfer direction is shown with a dashed arrow in FIG. 13*a*. When gel electrolyte was applied to the film, due to the strong oxidizing property of $S_2O_8^{2-}$, the polymer was oxidized to the PNB form of PANI. Loss of the electron which used to be at the polaron level (level 'a' in FIG. 13) changed the energy structure of the polymer as observed by the color change to blue, implying a bandgap increase to about 2.2 eV. Also, as the ions in the gel electrolyte were reduced, the electrochemical potential of the electrolyte was increased to a higher level.

The change in the electrochemical potential could be found from the Nernst equation based on the concentrations of $S_2O_8$ and $SO_4$ in the reversible reaction between the two ions ($S_2O_8+2e \leftrightarrow 2SO_4^{2-}$). In equilibrium, the Fermi level should be the same in FTO, PANI, and gel electrolyte. The equilibrium condition was changed when a low work function metal touched the solid PVA-gel electrolyte. The interaction between the PVA-gel electrolyte and the metal resulted in the insertion of electrons into the FTO-PANI-gel multilayer structure. The addition of electrons changed the balance in the redox reaction between $S_2O_8$ and $SO_4$, resulting in an increase in the electrochemical potential of the electrolyte. The change in the energy level forced electrons to be transferred to the polymer film and reduced PNB to the LEU form, which is transparent with a bandgap of about 3.9 eV. Shortly after the color change, a new equilibrium condition was established in the structure with the metal contact. As shown in FIG. 13, the status of electrons in energy level 'a' affected the energy structure of the polymer, resulting in the color change.

In summary, described herein, are solid state touchchromic devices. The mechanism of the color change is unexpected compared to previously disclosed liquid electrolyte based touchchromic devices. Certain embodiments cover PVA+$H_3PO_4$+APS gel over PANI film, which is coated over conducting ITO or FTO coated glass plate. The fabrication of liquid gel, application of gel over film, drying process, and coloration and decoloration in the solid state device can be understood through various schematics shown in FIGS. 7-11. In certain embodiments, the color contrast of the solid touchchromic device depends upon the ratio of PVA, APS, acid content in the gel or solid electrolyte layer, and ways to making the solid device with curing at different temperatures. The gelling of the PVA+$H_3PO_4$+APS may be important before application over PANI film. Regardless, the solid touchchromic devices disclosed herein bring reality to finding practical applications for camouflage, sensors, rear view mirrors for vehicles, windows, toys, and displays applications, among others. Thus, the disclosure provides, among other things, a solid touchchromic device.

For reasons of completeness, various aspects of the invention are set out in the following numbered clauses:

Clause 1. A solid touchchromic device comprising: a solid electrolyte layer derived from a polymer, an acid, and an oxidant; a conductive plate; and a conductive polymer film in contact with the conductive plate and the solid electrolyte layer.

Clause 2. The solid touchchromic device of clause 1, wherein the conductive polymer is selected from the group consisting of a polyaniline, a polypyrrole, a polythiophene, a polyindole, a polycarbazole, and combinations thereof.

Clause 3. The solid touchchromic device of clause 2, wherein the polyaniline is selected from the group consisting of poly(ortho-anisidine) (POAS), poly(o-toluidine) (POT), poly(ethoxy-aniline), substituted polyanilines, and combinations thereof.

Clause 4. The solid touchchromic device of any of clauses 1-3, wherein the conductive polymer film further comprises a metal oxide, a dye or a combination thereof.

Clause 5. The solid touchchromic device of clause 4, wherein the metal oxide is selected from the group consisting of $WO_3$, $SnO_2$, $In_2O_3$, $TiO_2$, and combinations thereof.

Clause 6. The solid touchchromic device of clause 4, wherein the dye is selected from the group consisting of rhodamine, congo red, eosin dye, methylene blue, methyl viologen, and combinations thereof.

Clause 7. The solid touchchromic device of any of clauses 1-6, wherein the polymer is selected from the group consisting of poly(vinyl alcohol) (PVA), poly(vinyl acetate), poly(vinyl alcohol co-vinyl acetate), poly(methyl methacrylate), poly(vinyl alcohol-co-ethylene ethylene), poly(vinyl butyral-co-vinyl alcohol-co-vinyl acetate), polyvinyl butyral, polyvinyl chloride, polystyrene, and combinations thereof.

Clause 8. The solid touchchromic device of any of clauses 1-7, wherein the solid electrolyte layer is derived from at least two different polymers.

Clause 9. The solid touchchromic device of any of clauses 1-8, wherein the conductive plate is selected from the group consisting of an indium tin oxide (ITO) coated glass plate, an indium tin oxide (ITO) coated plastic plate, and a fluorine doped tin oxide (FTO) coated plate.

Clause 10. The solid touchchromic device of any of clauses 1-9, wherein the oxidant is selected from the group consisting of aluminum nitrate, ammonium dichromate, ammonium peroxydisulphate (APS), barium nitrate, bismuth nitrate, calcium hypoperchlorate, copper (II) nitrate, cupric nitrate, ferric nitrate, hydrogen peroxide, lithium hydroxide monohydrate, magnesium nitrate, magnesium perchlorate, potassium chlorate, potassium dichromate, potassium permanganate, sodium hypochlorite, sodium periodate, zinc nitrate hydrate, nitric acid, sulfuric acid, perchloric acid, ammonium nitrate, silver nitrate, benzoyl peroxide, tetranitromethane, sodium perchlorate, potassium perchlorate, potassium permanganate, potassium persulfate, sodium nitrate, potassium chromate, and combinations thereof.

Clause 11. The solid touchchromic device of any of clauses 1-10, wherein the acid is selected from the group consisting of acetic acid, propionic acid, hydrochloric acid, hydrofluoric acid, phosphoric acid, sulfuric acid, formic acid, benzoic acid, hydrofluoric acid, nitric acid, phosphoric acid, sulfuric acid, tungstosilicic acid hydrate, hydriodic acid, carboxylic acid, dicarboxylic acid, tricarboxylic acid, oxalic acid, hexacarboxylic acid, citric acid, p-camphor sulfonic, a combination of $FeCl_3$ and polyacrylic acid, tartaric acid, oxalic acid, and combinations thereof.

Clause 12. The solid touchchromic device of any of clauses 1-11, further comprising a second conductive plate positioned on the solid electrolyte layer such that the solid electrolyte layer and the conductive polymer film are positioned between the conductive plate and the second conductive plate.

Clause 13. The solid touchchromic device of any of clauses 1-12, further comprising a metal configured to contact the solid electrolyte layer or the second conductive plate, wherein the solid touchchromic device changes from a first color to a second color in response to the metal contacting the solid electrolyte layer or the second conductive plate.

Clause 14. The solid touchchromic device of clause 13, wherein the metal is selected from the group consisting of copper, low carbon steel, nickel, zinc, iron, indium, tin, aluminum, manganese, cobalt, palladium, silver, lithium, magnesium, sodium, and combinations thereof.

Clause 15. The solid touchchromic device of any of clauses 1-14, wherein the solid touchchromic device comprises a salt selected from the group consisting of NaCl, $CoCl_2$, KCl, $MgCl_2$, and combinations thereof.

Clause 16. An article comprising the solid touchchromic device of any of clauses 1-15, wherein the article is selected from the group consisting of a sensor, a mirror, a window, a toy, a display, a detector, sunglasses, and camouflage.

Clause 17. A method of producing a solid touchchromic device, the method comprising: applying a conductive polymer film to a conductive plate; combining a polymer, an acid, and an oxidant to provide a mixture; applying the mixture to the conductive polymer film to provide a solid electrolyte layer on the conductive polymer film, such that the conductive polymer film contacts the conductive plate and the solid electrolyte layer; and heating the solid electrolyte layer, the conductive polymer film and the conductive plate at less than 80° C. to form the solid touchchromic device of any of clauses 1-15.

Clause 18. The method of clause 17, further comprising applying a second conductive plate to the solid electrolyte layer such that the solid electrolyte layer and the conductive polymer film are between the conductive plate and the second conductive plate.

Clause 19. A method of using a solid touchchromic device, the method comprising: contacting the solid electrolyte layer or the second conductive plate with the metal of the solid touchchromic device of clause 13, wherein the solid touchchromic device changes from a first color to a second color in response to the metal contacting the solid electrolyte layer or the second conductive plate; and optionally moving the metal out of contact with the solid electrolyte layer or the second conductive plate, wherein the solid touchchromic device changes from the second color to the first color in response to the metal no longer contacting the solid electrolyte layer or the second conductive plate.

Clause 20. A composition derived from: PVA, $H_3PO_4$, and APS, wherein the composition is a gel.

What is claimed is:

1. A solid touchchromic device comprising:

a) heat treated components comprising a transparent solid electrolyte layer, a conductive polymer film, and a conductive plate, wherein the transparent solid electrolyte layer is disposed over the conductive polymer film and consisting essentially of a mixture of a polymer, an acid, and an oxidant, and has a thickness of about 10 nm to less than 1 μm, wherein the polymer is selected from the group consisting of poly(vinyl alcohol) (PVA), poly(vinyl acetate), poly (vinyl alcohol covinyl acetate), poly(methyl methacrylate), poly(vinyl alcohol-co-ethylene ethylene), poly (vinyl butyral-co-vinyl alcohol-co-vinyl acetate), polyvinyl butyral, polyvinyl chloride, polystyrene, and combinations thereof, and wherein the transparent solid electrolyte layer exhibits a fibril structure; and wherein the conductive polymer film is in contact with the conductive plate and the solid electrolyte layer; and b) a second conductive plate disposed on the transparent solid electrolyte layer, wherein the device reversibly changes colors in response to a metal contacting the solid electrolyte layer or the second conductive plate.

2. The solid touchchromic device of claim 1, wherein the conductive polymer is selected from the group consisting of a polyaniline, a polypyrrole, a polythiophene, a polyindole, a polycarbazole, and combinations thereof.

3. The solid touchchromic device of claim 2, wherein the polyaniline is selected from the group consisting of poly (ortho-anisidine) (POAS), poly(o-toluidine) (POT), poly (ethoxy aniline), substituted polyanilines, and combinations thereof.

4. The solid touchchromic device of claim 1, wherein the conductive polymer film further comprises a metal oxide, a dye, or a combination thereof.

5. The solid touchchromic device of claim 4, wherein the metal oxide is selected from the group consisting of $WO_3$, $SnO_2$, $In_2O_3$, $TiO_2$, and combinations thereof.

6. The solid touchchromic device of claim 4, wherein the dye is selected from the group consisting of rhodamine, congo red, eosin dye, methylene blue, methyl viologen, and combinations thereof.

7. The solid touchchromic device of claim 1, wherein the solid electrolyte layer mixture comprises at least two different polymers.

8. The solid touchchromic device of claim 1, wherein the conductive plate is selected from the group consisting of an indium tin oxide (ITO) coated glass plate, an indium tin oxide (ITO) coated plastic plate, and a fluorine doped tin oxide (FTO) coated plate.

9. The solid touchchromic device of claim 1, wherein the oxidant is selected from the group consisting of aluminum nitrate, ammonium dichromate, ammonium peroxydisulphate (APS), barium nitrate, bismuth nitrate, calcium hypoperchlorate, copper (II) nitrate, cupric nitrate, ferric nitrate, hydrogen peroxide, lithium hydroxide monohydrate, magnesium nitrate, magnesium perchlorate, potassium chlorate, potassium dichromate, potassium permanganate, sodium hypochlorite, sodium periodate, zinc nitrate hydrate, nitric acid, sulfuric acid, perchloric acid, ammonium nitrate, silver nitrate, benzoyl peroxide, tetranitromethane, sodium perchlorate, potassium perchlorate, potassium permanganate, potassium persulfate, sodium nitrate, potassium chromate, and combinations thereof.

10. The solid touchchromic device of claim 1, wherein the acid is selected from the group consisting of acetic acid, propionic acid, hydrochloric acid, hydrofluoric acid, phosphoric acid, sulfuric acid, formic acid, benzoic acid, hydrofluoric acid, nitric acid, phosphoric acid, sulfuric acid, tungstosilicic acid hydrate, hydriodic acid, carboxylic acid, dicarboxylic acid, tricarboxylic acid, oxalic acid, hexacarboxylic acid, citric acid, p-camphor sulfonic, a combination of $FeCl_3$ and polyacrylic acid, tartaric acid, oxalic acid, and combinations thereof.

11. The solid touchchromic device of claim 1, wherein the metal is selected from the group consisting of copper, low carbon steel, nickel, zinc, iron, indium, tin, aluminum, manganese, cobalt, palladium, silver, lithium, magnesium, sodium, and combinations thereof.

12. The solid touchchromic device of claim 1, wherein the solid touchchromic device comprises a salt selected from the group consisting of NaCl, $CoCl_2$, KCl, $MgCl_2$, and combinations thereof.

13. An article comprising the solid touchchromic device of claim 1, wherein the article is selected from the group consisting of a sensor, a mirror, a window, a toy, adisplay, a detector, sunglasses, and camouflage.

14. A method of producing a solid touchchromic device, the method comprising:

applying a conductive polymer film to a conductive plate;

combining a polymer, an acid, and an oxidant to provide a mixture;

applying the mixture to the conductive polymer film to provide a transparent solid electrolyte layer on the conductive polymer film, such that the conductive polymer film contacts the conductive plate and the transparent solid electrolyte layer; and heating the solid electrolyte layer, the conductive polymer film and the conductive plate at less than 80° C. to form the solid touchchromic device of claim 1.

15. The method of claim 14, further comprising applying a second conductive plate to the solid electrolyte layer such that the solid electrolyte layer and the conductive polymer film are between the conductive plate and the second conductive plate.

16. A method of using a solid touchchromic device, the method comprising:

contacting the solid electrolyte layer or a second conductive plate with the metal of the solid touchchromic device of claim 1, wherein the solid touchchromic device changes from a first color to a second color in response to the metal contacting the solid electrolyte layer or the second conductive plate; and optionally moving the metal out of contact with the solid electrolyte layer or the second conductive plate, wherein the solid touchchromic device changes from the second color to the first color in response to the metal no longer contacting the solid electrolyte layer or the second conductive plate.

17. The solid touchchromic device of claim 1, wherein the device changes a color from a first color to a second color after contact with the metal.

18. The solid touchchromic device of claim 17, wherein the device changes a color from the second color to the first color when the metal contact is removed.

19. The solid touchchromic device of claim 17, wherein the device changes a color from the first color to the second color within about 1 sec to about 30 min after contact with the metal.

* * * * *